US011958207B2

(12) United States Patent
Mitchell et al.

(10) Patent No.: US 11,958,207 B2
(45) Date of Patent: Apr. 16, 2024

(54) METHOD AND APPARATUS FOR FEEDING AN EDGER

(71) Applicant: Salem Equipment, Inc., Sherwood, OR (US)

(72) Inventors: Rory Matthew Mitchell, Beaverton, OR (US); Allison Nicole Mitchell, Beaverton, OR (US)

(73) Assignee: Salem Equipment, Inc., Sherwood, OR (US)

( * ) Notice: Subject to any disclaimer, the term of this patent is extended or adjusted under 35 U.S.C. 154(b) by 115 days.

(21) Appl. No.: 17/688,046

(22) Filed: Mar. 7, 2022

(65) Prior Publication Data

US 2022/0184842 A1 Jun. 16, 2022

Related U.S. Application Data

(63) Continuation of application No. 16/438,005, filed on Jun. 11, 2019, now Pat. No. 11,267,157.

(60) Provisional application No. 62/683,509, filed on Jun. 11, 2018.

(51) Int. Cl.
*B27B 1/00* (2006.01)
*B27B 31/06* (2006.01)

(52) U.S. Cl.
CPC .............. *B27B 1/007* (2013.01); *B27B 31/06* (2013.01)

(58) Field of Classification Search
CPC .......... B27B 5/04; B27B 25/00; B27B 25/02; B27B 25/04; B27B 25/06; B27B 31/00; B27B 31/003; B27B 31/006; B27B 31/02; B27B 31/04; B27B 31/06
See application file for complete search history.

(56) References Cited

U.S. PATENT DOCUMENTS

| | | | |
|---|---|---|---|
| 4,462,443 | A | 7/1984 | Allen |
| 5,826,637 | A | 10/1998 | Newnes et al. |
| 6,308,756 | B1 | 10/2001 | Anttila |
| 2008/0230151 | A1 | 9/2008 | Appeldoorn et al. |
| 2011/0079324 | A1 | 4/2011 | Appeldoorn et al. |

OTHER PUBLICATIONS

USPTO, non-final Office Action, U.S. Appl. No. 16/438,005, filed Apr. 23, 2021, pp. 1-16.
USPTO, non-final Office Action, U.S. Appl. No. 16/823,607, filed Jul. 7, 2022, pp. 1-11.

*Primary Examiner* — Matthew Katcoff
(74) *Attorney, Agent, or Firm* — Chernoff Vilhauer, McClung & Stenzel, LLP

(57) ABSTRACT

An edger feeding apparatus and method of placing flitches in position to be fed into an edger with minimal spacing between successive flitches and with flitches oriented and the edger adjusted so as to yield a maximum value of lumber from each flitch. The edger feeding apparatus may include a scanning system for creating and storing a digital three-dimensional model of each flitch. The apparatus and method may also include a control computer and its use for determining the optimum position for feeding each flitch into the edger to produce the most valuable yield of lumber from the flitch.

23 Claims, 20 Drawing Sheets

METHOD AND APPARATUS FOR FEEDING AN EDGER

CROSS-REFERENCE TO RELATED APPLICATIONS

This application is a continuation of U.S. Non-Provisional patent application Ser. No. 16/438,005 filed on Jun. 11, 2019 and entitled "METHOD AND APPARATUS FOR FEEDING AN EDGER." which claims the benefit of U.S. Provisional Patent Application Ser. No. 62/683,509 filed on Jun. 11, 2018 and entitled "METHOD AND APPARATUS FOR FEEDING AN EDGER." The complete disclosures of the above applications are hereby incorporated by all reference for all purposes.

BACKGROUND

The present invention relates to processing wood products, and in particular to apparatus and a method for feeding flitches into an edger so as to optimize production of marketable lumber from the flitches.

When a log is sawed in the process of producing lumber a cant or cants are produced from the central portion of the log by removing slabs and flitches from sides of the log, usually in a way to maximize the marketable amount of lumber that can be produced from the cants. Flitches removed from the sides of the log may include wane that can be removed by an edger to obtain marketable lumber from each flitch.

An edger typically includes several parallel circular saw blades spaced at standard distances, or in some cases adjustably spaced, along an arbor. Sets of powered bottom rollers and press rollers are arranged to run a flitch longitudinally through the edger saws to produce standard-sized boards and remove edge portions that have no commercial value as lumber.

In conventional practice, an edger operator manually places each flitch onto infeed rollers of an edger in a position estimated to provide the maximum amount of marketable lumber from a particular flitch, in some cases with the assistance of laser guidelines. In such conventional edger operation flitches are delivered serially and longitudinally into a preliminary position where the edger operator must adjust its position and orientation before edger infeed rollers pinch the flitch and deliver it into the saw blades. As a result, there is a significant gap between the tail end of a flitch being sawn in the edger and the head end of the next flitch to enter the edger saw blades.

As a result of the gaps between flitches being fed into an edger, there may be a significant delay, or dead time, of as much as a few seconds between flitches going through an edger. The output of an edger could be significantly increased by reducing the space between the tail of one flitch and the head end of the next flitch, thus reducing the dead time between successive flitches.

What is desired, then, is a way to reduce the dead time between flitches being sent through an edger, and at the same time to maximize the production of marketable lumber from flitches by ensuring that they are located and oriented, as they pass through an edger, so as to produce boards calculated to result in the maximum value of marketable boards from each flitch.

SUMMARY

As an answer to some of the needs explained above, an edger feeding apparatus and a method of feeding flitches into an edger with only a minimum spacing and dead time between successive flitches are disclosed hereinbelow and defined in the claims that form a part of the disclosure.

In one embodiment of the apparatus disclosed herein, a feed line, also called a scanner and carriage assembly, moves individual flitches laterally, in a direction transverse to the length of each flitch, and a scanning system associated with the feed line measures each flitch and creates and stores a digital three-dimensional model of each flitch. The flitches are moved to a transfer ready position at an outfeed end of the scanner and carriage assembly in readiness to be transferred laterally to an edger ready position near the infeed end of an edger and a small distance above the edger infeed mechanism. Transfer of successive flitches to the edger infeed mechanism is accomplished in a much shorter time than by moving each flitch longitudinally after another.

In one embodiment of the apparatus, a control computer keeps the digital models of the flitches in memory in a queue specifically identifying the three-dimensional model of each flitch. Based on, for example, tabulations of the commercial values of different sizes and qualities of boards, the control computer determines how each flitch should be located and oriented on the edger infeed mechanism as it proceeds longitudinally through the edger, to produce the most valuable yield of lumber from that flitch.

In one embodiment of the apparatus, each flitch is stopped in a transfer ready holding position and then is engaged to be moved by a charger subassembly. Each charger subassembly includes a lower flitch carrier member spaced apart from another along the length of the flitch, and each flitch carrier member includes a turntable portion which can engage the bottom of the flitch. A respective upper contact pad is moved down by an actuator to press the flitch onto the turntable portion of the flitch carrier member. The upper contact pad is positioned located directly above the turntable portion of the flitch carrier member. The flitch carriers are moved to carry the flitch laterally to the edger ready position, in a desired location and orientation above the edger infeed mechanism in a very short time. Each of the upper contact pads is controlled to move together with and remain aligned with the turntable of its corresponding flitch carrier member as the feed forks and contact pads move the flitch to the desired edger ready position with respect to an infeed mechanism of the edger that will result in the maximum commercial value of the boards that can be obtained from that flitch.

For example, an edge portion may be removed from each edge of a flitch, leaving a single dimensional board with four flat sides. For another flitch the control computer may direct the feed forks to orient and position the flitch where the edger will produce one board with four flat sides and another, lower grade, board with one edge surface including acceptable wane, depending upon the shape of the digital model of the flitch that has been produced by the control computer as result of scanning the flitch. Yet another flitch may be oriented and positioned so that when it proceeds through the edger two boards with acceptable wane will be produced.

In one embodiment of the apparatus, when a flitch is positioned above the infeed mechanism, a set of tipples adjacent the infeed mechanism are moved upward and into supporting contact with the underside of the flitch. At the same time, an infeed press roller associated with a tipple is lowered into contact with the upper side of the flitch, so the flitch is held in the correct location. Once the flitch has been grasped and is held by the tipples and the press rollers the flitch carrier members and the upper contact pads release the flitch and are retracted. The infeed press rollers keep the flitch in the desired orientation and location established by the carrier members and pressure pads and in contact with and supported by the tipples.

Once a preceding flitch has been moved far enough toward the edger saws the tipples are lowered and the accompanying infeed press rollers are raised, moving the flitch in the direction of movement of the infeed mechanism and lowering the flitch onto the infeed mechanism. In one embodiment of the invention the control computer takes into account the time that may be required to adjust the positions of the edger saw blades after the preceding flitch has cleared, while the flitch is supported and held by the tipples and press roller. The flitch is then lowered onto the edger infeed mechanism at a calculated time and in a controlled fashion so as to come into contact with the edger infeed mechanism in the position and orientation that has been calculated by the control computer to result in producing boards of optimum value from that flitch.

In accordance with one aspect of a method disclosed herein, then, each of a series of flitches is scanned, a queue of three-dimensional models is produced, and the control computer calculates a position and an orientation for each flitch so as to feed the flitch into the edger and thus produce the optimal yield of lumber from the flitch. When a flitch reaches the final position on the feedline, or scanner and carriage assembly, where it is the next in line to be sent through the edger, it is moved by the flitch carrier members to a predetermined orientation and position above the edger infeed mechanism. When a preceding flitch has moved out of the way the flitch is engaged by tipples and pressure rollers and the flitch carrier members are retracted.

After a preceding flitch has moved a calculated distance toward the edger saws the flitch may be lowered onto the edger infeed chain and moved to where it can be engaged by infeed rollers of the edger. If the flitch is to be sawn into a different number of boards or into boards of widths or locations within the flitch that are different from the preceding flitch the amount of time required to adjust the edger saws is taken into account in determining when to move the flitch from the ready position to be engaged by the edger infeed mechanism.

The foregoing and other objectives and features of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
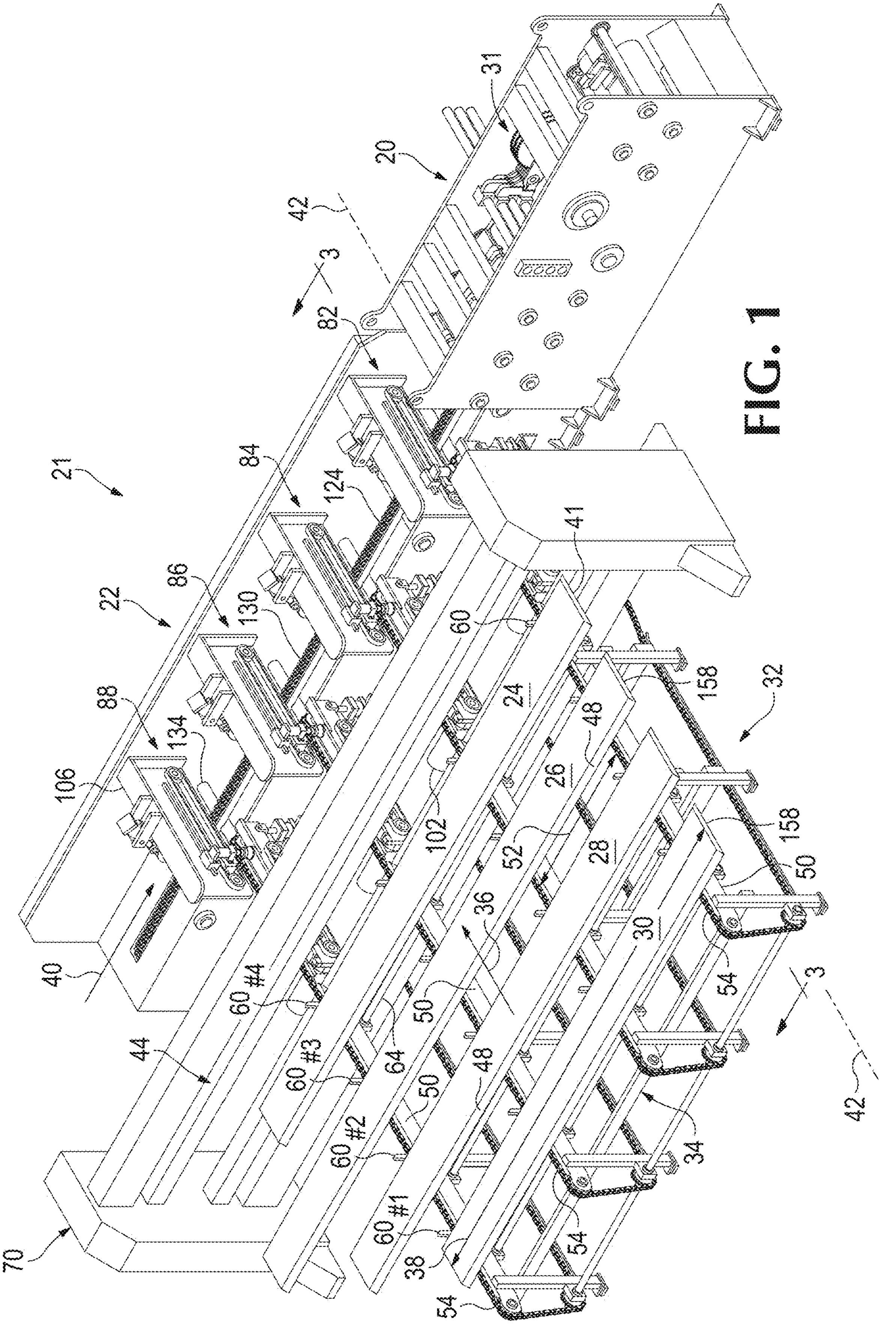
FIG. 1 is an isometric view of an edger feed assembly embodying various aspects of the present invention.
Figure 2:
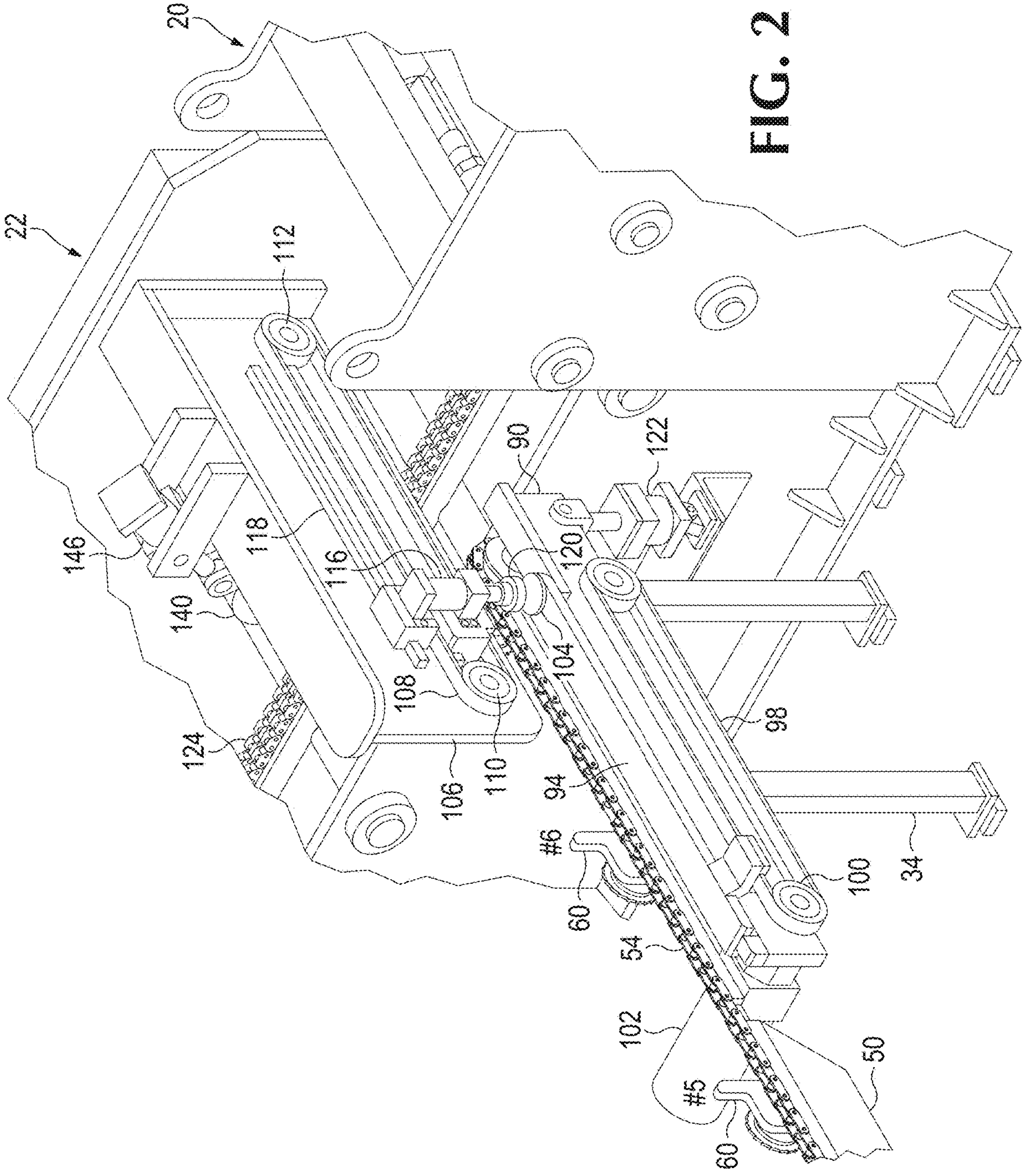
FIG. 2 is a view of a portion of FIG. 1, at an enlarged scale.

Referring first to FIGS. 1-4 of the drawings that form a part of the disclosure herein, an edger 20 has an edger infeed mechanism 22 arranged to deliver a flitch of wood 24, 26, 28, or 30, etc. into the edger 20. The edger 20 includes a set of edger saws 31 that are spaced apart from each other so as to produce a board or set of boards from a flitch 24, etc., while removing bark-covered wane portions of the flitch that are of no commercial value as lumber. The edger infeed mechanism is controlled and operated by various sensors and servo systems shown schematically in FIG. 19.

A scanner and carriage assembly 32, that also may be called a feedline, has a structural frame 34 oriented to deliver flitches 24, 26, etc. to the edger 20 by moving each flitch laterally, that is, in the direction of the arrow 36, perpendicular to the length 38 of each flitch 24, 26, etc. The flitches are arranged side-by-side, lying flat and with their lengths oriented generally parallel with the arrow 40, indicating the direction in the direction of which each flitch will pass longitudinally through the edger 20. An end of each flitch that will be the leading end 41 as the flitch enters the edger is aligned with a lumber line 42, at the right-hand end of the scanner and carriage assembly 32 as seen in FIG. 1. The flitches may be loaded onto the scanner and carrier assembly 32 manually or by conventional loading apparatus that need not be disclosed herein.

Figure 18A:
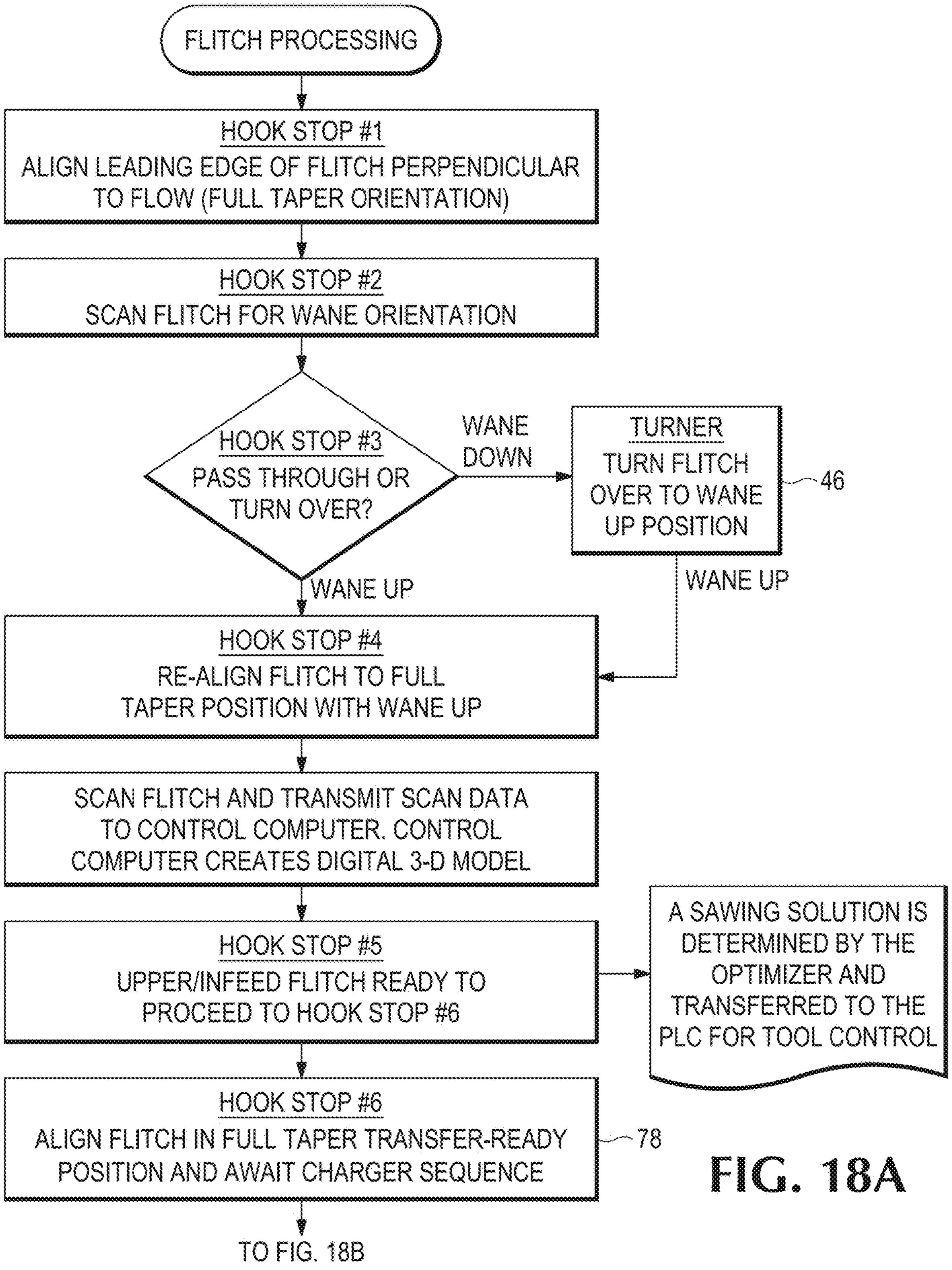
FIG. 18A-18D are a functional flowchart of a functional operational sequence for operation of the edger feeder apparatus shown in FIG. 1.
Figure 18B:
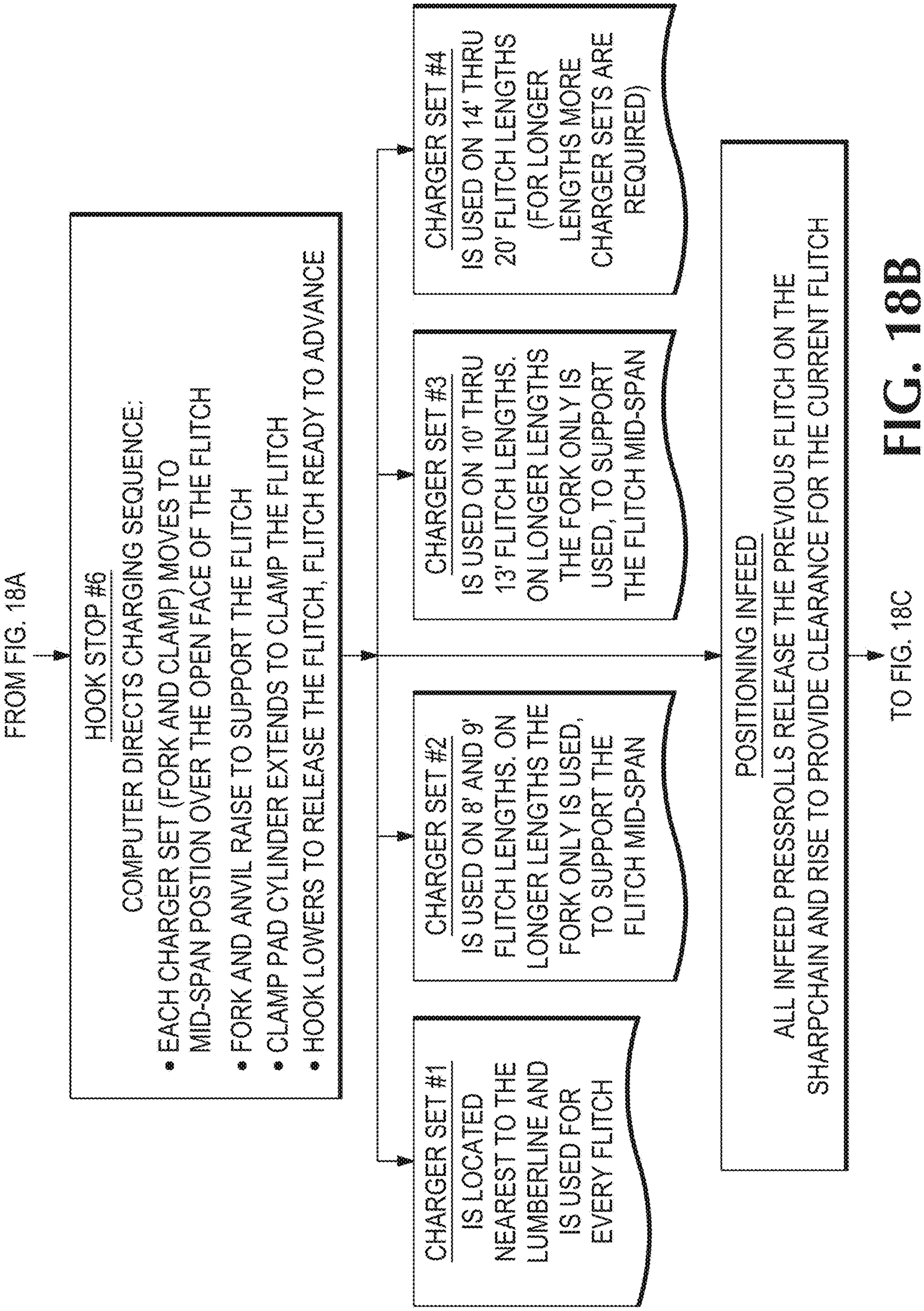
Figure 18C:
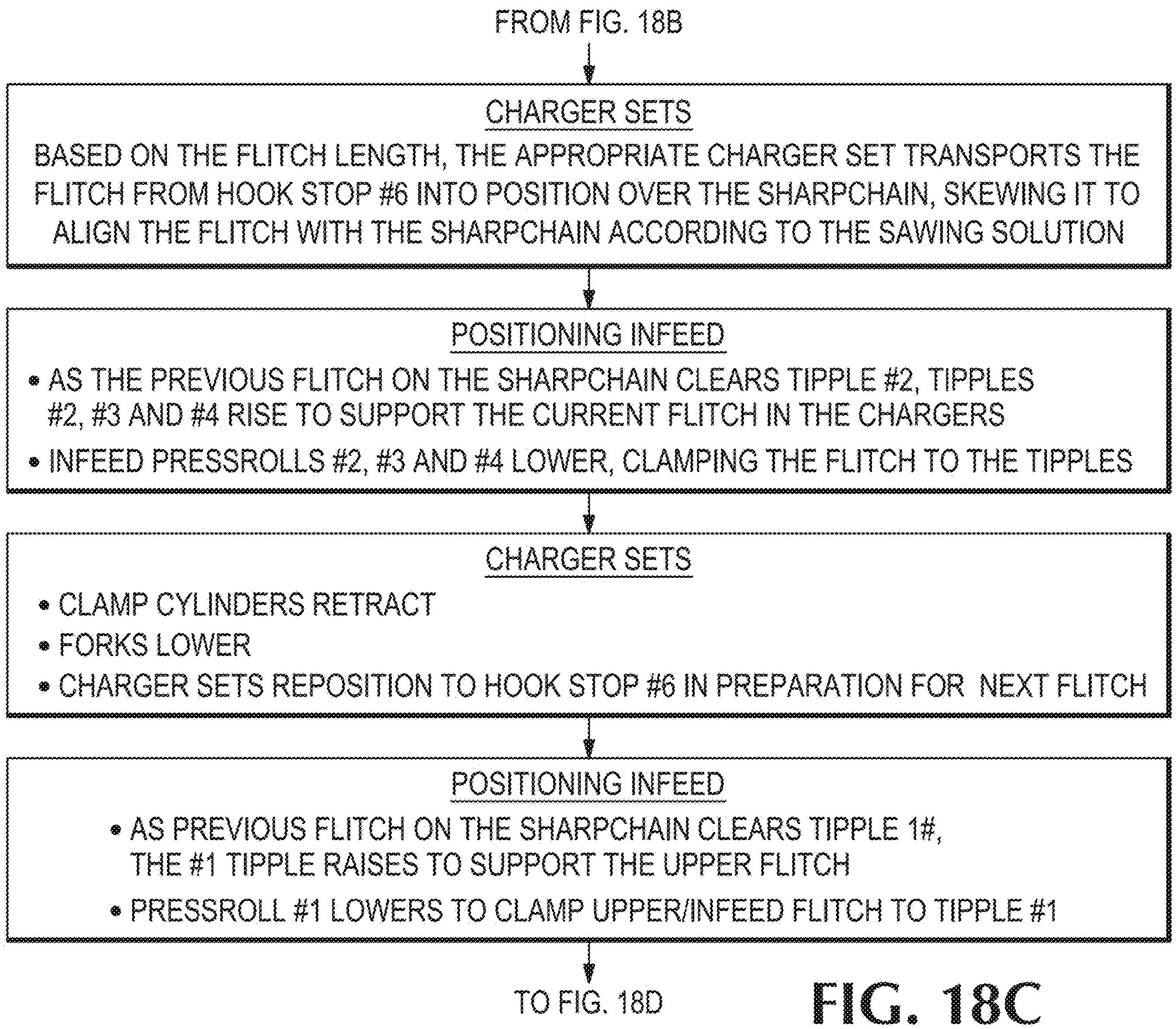
Figure 18D:
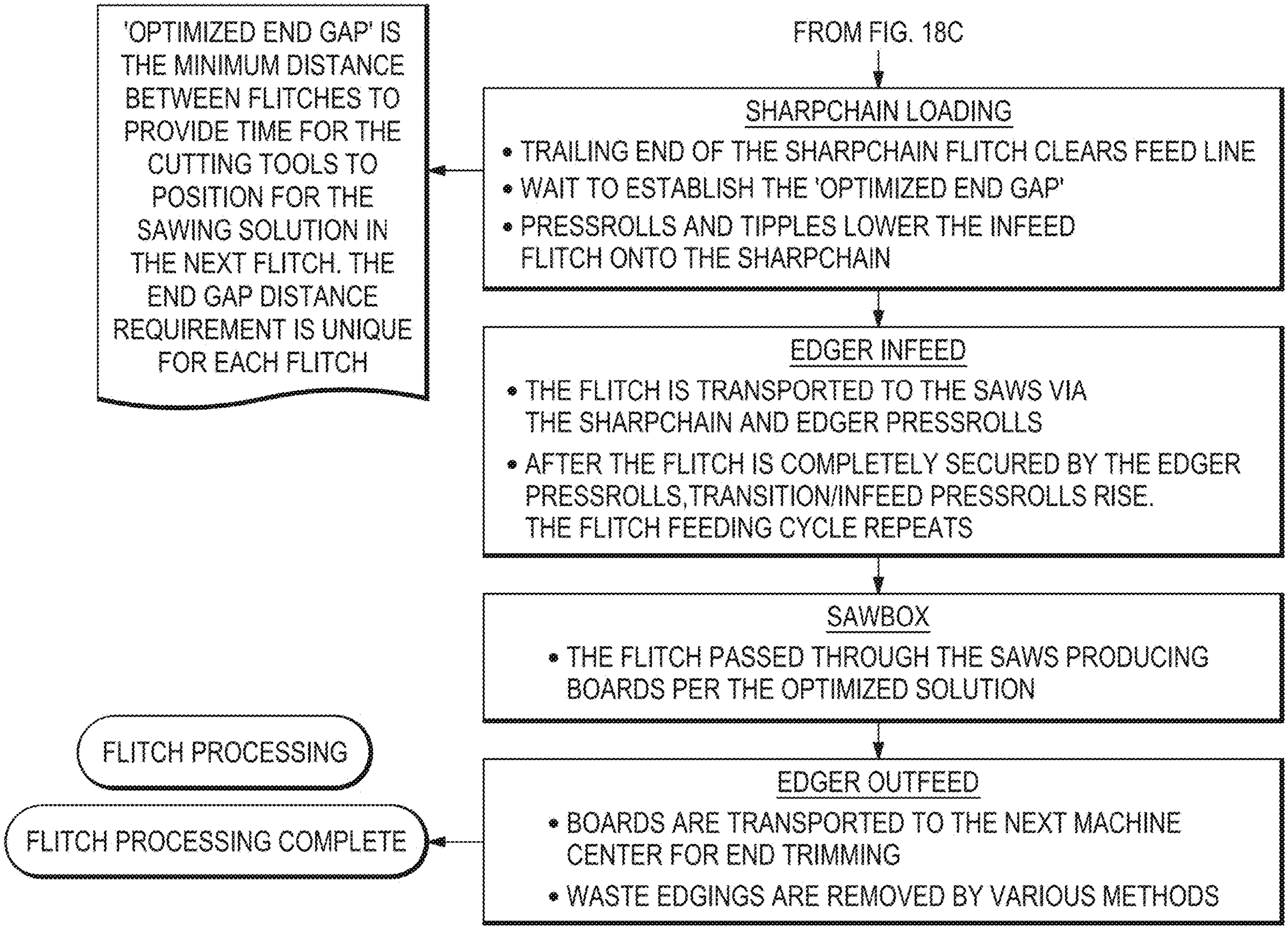

Depending upon the amount of manual labor that will be acceptable, the scanner and carriage assembly 32 may include a scanner (not shown) capable of discovering whether a wane side of a flitch is up or down. A flitch turning mechanism 46 mentioned in FIG. 18A, may be included in the feed line assembly 32 to turn flitches over as necessary for the wane side 48 of each flitch 24, etc. to face upward. Such a mechanism is well known and need not be described herein. Flitches located on the scanner and carriage assembly are desirably oriented with the narrower, or waned, face of each facing upward to be measured by the scanner system 44 in determining how to edge the flitch.

The frame 34 of the feed chain or scanner and carriage 32 assembly or scanner and carriage 30 includes a group of feed rail assemblies 50 that are oriented horizontally and parallel with each other, separated from one another by a distance 52 that is somewhat less than the length of the shortest flitch intended to be fed to the edger 20. For example, the feed rail assemblies 50 may be spaced apart from each other by a distance corresponding to a standard board length intended to be produced. As shown in FIG. 1, there are four feed rail assemblies 50 in the scanner and carriage assembly 32.

Figure 3:
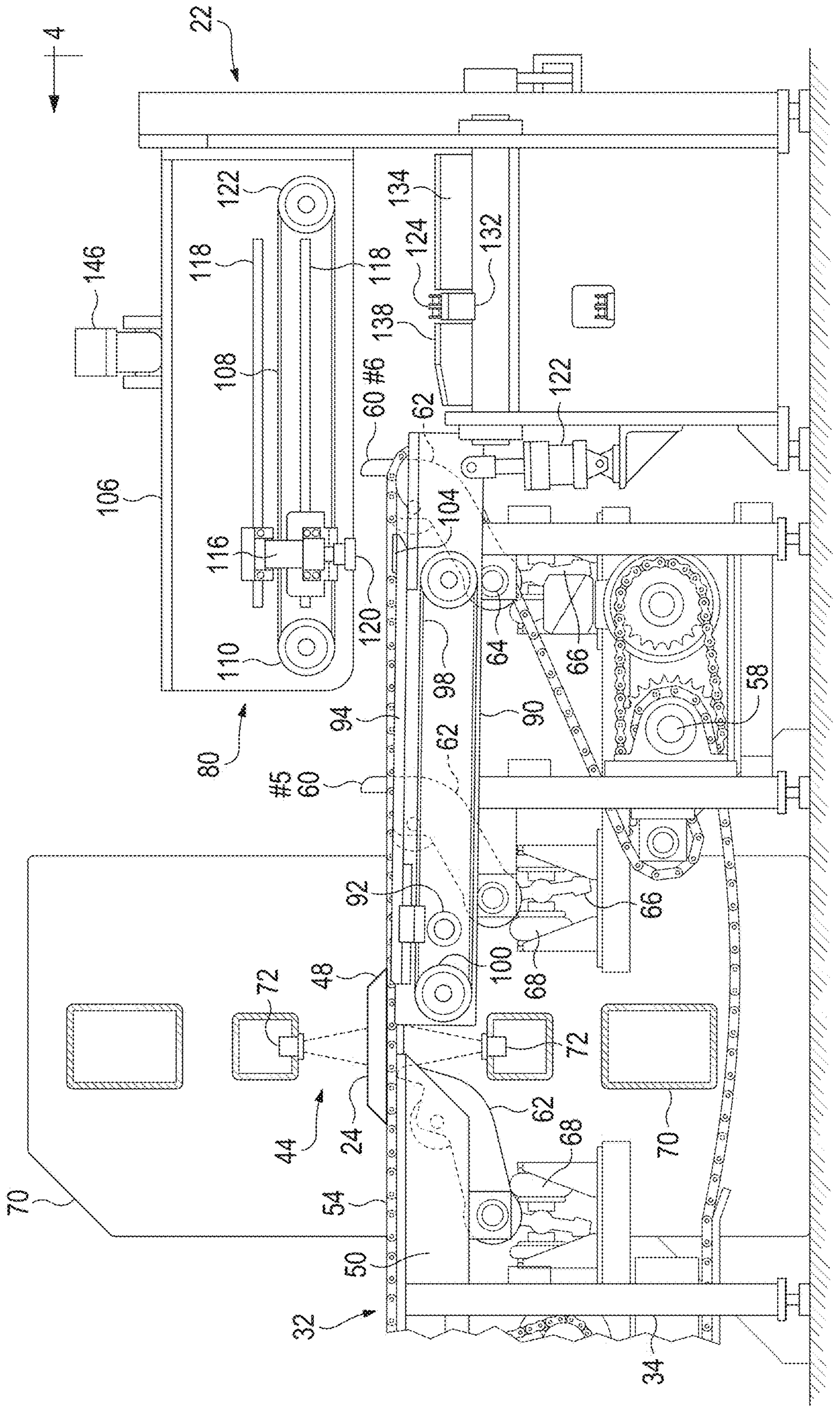
FIG. 3 is a right side elevational view of a portion of the apparatus shown in FIG. 1, taken along line 3-3 in FIG. 1.

Endless loop feed chains 54 of which there are four shown in FIG. 1, are engaged with appropriate sprockets so as to move in respective parallel vertical planes. The endless feed chains 54 are arranged to be driven synchronously by drive sprockets carried on a chain drive shaft 58, as best seen in FIG. 3. An upper portion of each of the endless chains 54 may be disposed horizontally and ride along the top of a respective one of the feed rail assemblies 50 to support flitches 24, 26, etc. and move them along the feed rail assemblies 50 toward the edger infeed mechanism 22, spaced apart from each other by a desired distance. The feed chains 54 are driven to move continuously to carry the flitches 24, 26, etc. toward the edger infeed mechanism 22.

Six sets of hooks 60, seen in FIG. 1, extend across the direction of movement of the feed chains. They are carried on pivoted arms 62 and are arranged to be raised and lowered periodically to let each flitch 24, 26, etc. move in steps through predetermined distance along the scanner and carriage assembly 32 toward the edger infeed mechanism 22, and to keep the flitches separated from each other. When a set of hooks 60 is raised and obstructs one of the flitches the feed chains 54 continue to move, but the links of the feed chains preferably have smooth straight outer surfaces that can slide along the bottom face of a flitch 24, etc. without causing damage when the flitch is held stationary by one of the sets of hooks 60. At the same time, however, the flitches 24, 26, 28, etc. are engaged by the feed chains 54 with sufficient friction that each flitch is carried with negligible slippage when the flitch is not obstructed by a set of the hooks 60.

As may be seen in FIG. 1, there may be six sets of hooks, spaced apart by a convenient distance such as 30 inches that may be designed accordingly to the size of flitches installed to be handled. As a flitch is carried along the scanner and carriage assembly 32 it is stopped momentarily at each set of hooks 60, which may be called hook stop #1, or hook stop #2, etc. Various functions may be carried out at each hook stop or between one hook stop and the next, as will be explained in greater detail below.

The arms 62 carrying the ones of a set of hooks 60 may all be mounted on a shaft 64 extending transversely of the scanner and carriage, or feed line, assembly, thus parallel with the length of a flitch on the scanner and carriage assembly. Each such shaft 64 may be rotated through a few degrees in either direction by a respective lever 66 that is moved in either direction by suitable means such as inflation and deflation of the ones of a respective pair of airbags 68, for example, as may be seen in FIG. 3.

Figure 19:
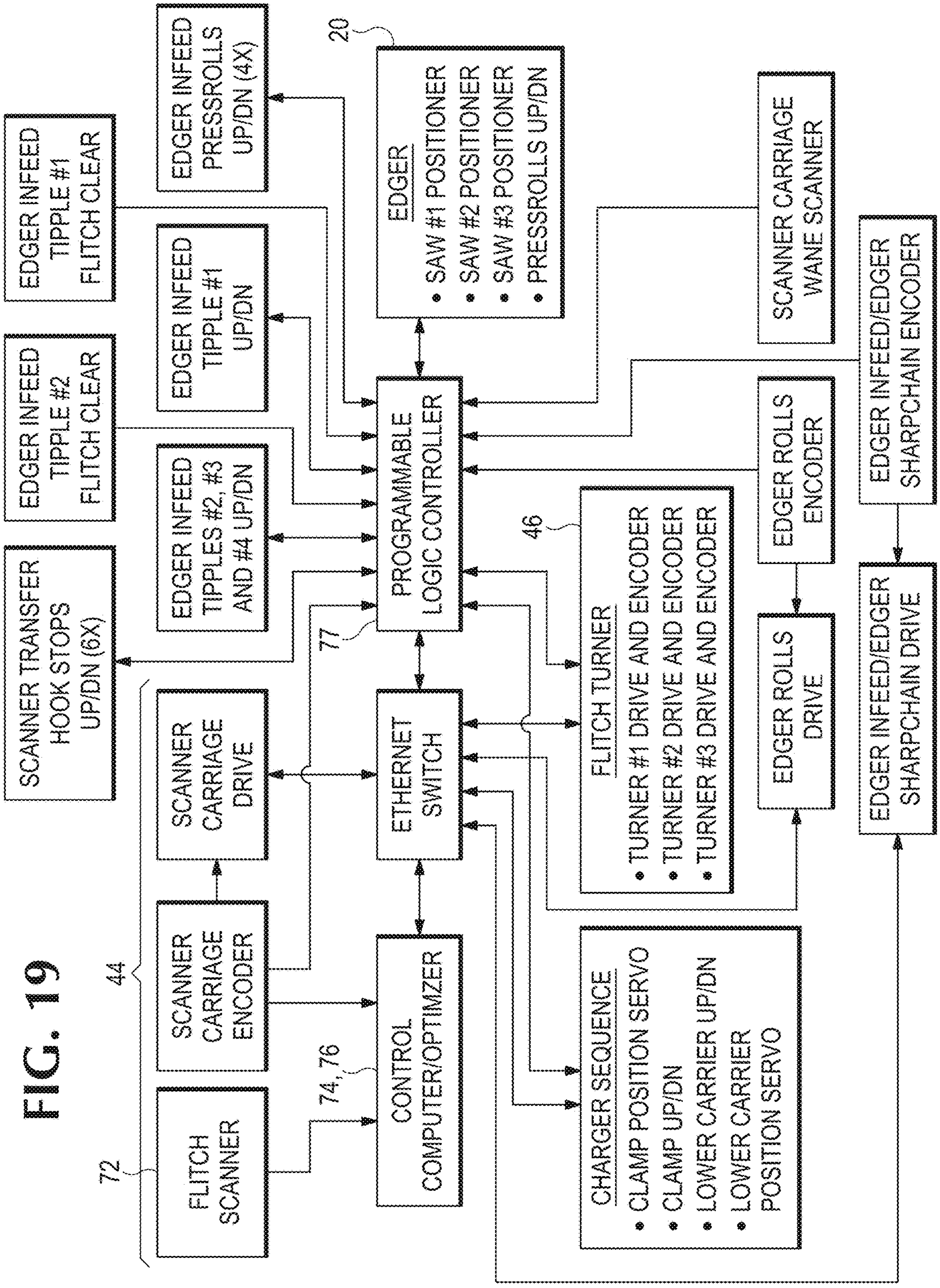
FIG. 19 is a block diagram of the control signal paths between some of the sensors and control and flitch-moving portions of the apparatus.

The flitch measuring scanner system 44, not shown in detail, is supported on a scanner support structure 70 extending above the scanner and carriage assembly 32. The scanner support structure 70 is long enough to permit passage of the longest flitch intended to be handled by the edger infeed mechanism. The scanner system 44 may include a scanner array 72 of several laser scanners, and is located between hook stop #4 and hook stop #5 along the scanner and carriage assembly 32, where each flitch 24, 26, etc. can be scanned precisely as it is carried along the feed rail assemblies 50 by the feed chains 54. The scanner array 72 may, for example, measure a flitch on a grid of points spaced at 0.035"×0.035" separation on all surfaces of the flitch. The scanner array 72 is connected functionally to a control computer 74, as shown in FIG. 19. Digital data derived from scanning each flitch 24, 26, etc. is delivered to the control computer 74, as by a suitable data cable (not shown).

The control computer 74 is adapted to receive the digital data from the scanner array 72 and to compile it as a digital three-dimensional model, such as a wireframe model, of each flitch. The three-dimensional model of a flitch may preferably be prepared to a resolution of 0.001 inch, to identify the boundaries of the flat upper face of each flitch, where the flitch begins to wane, and the control computer 74 utilizes the digital three-dimensional model as a basis for deciding what parts of the flitch should be removed by the edger 20. An optimizer section 76 of the control computer 74 incorporates a database which may include a tabulation of many different sizes, types, and grades of lumber and the current value of each. The control computer 74 may be programmed to determine from the three-dimensional model what boards of which grades can be produced from a particular flitch 24, for example, which parts of the flitch should be removed by the edger and how to cut the remaining portion of the flitch into pieces which can result in an optimum value of marketable lumber. A sawing solution is then developed by the control computer 74 and conforming instructions and data may be communicated among the various elements of the edger 20, the scanner and carriage assembly 32, and the edger feed mechanism 22 using a programmable logic controller 77 so that the flitch will be sawed accordingly by the edger 20. The sawing solution may include instructions to require the edger to adjust the positions of individual ones of the various saw blades.

The digital three-dimensional flitch models are retained in digital memory by the control computer 74, and are coordinated with data from the feed chains 54, making three-dimensional model of each flitch 24, 26, 28, or 30, etc. the size and shape of each flitch available for use by the control computer 74 when the flitch reaches a transfer ready position 78, in hook stop #6, at the outfeed end of the scanner and carriage, or feedline, assembly 32.

A charger assembly 88 is located at the outfeed end of the scanner and carriage assembly 32 to transfer each flitch to an edger infeed mechanism. The charger assembly includes a charger subassembly 82, 84, 86, and 88, each conveniently associated with one of the feed chains 54. The charger subassemblies for convenience will be called charger sets numbers 1, 2, 3, and 4, as seen in right-to-left order in FIG. 1. Each charger set 82, etc. includes a respective lower charger beam 90 supported by the frame 34 of the scanner and carriage assembly 32, and each such beam 90 is attached to the frame 34 by a pivot 92 near a rear, or inner, end of the beam 90. An elongate charger lower flitch support member 94 is mounted to move along a slide track extending along to the lower charger beam 90. An endless chain or toothed belt 98 is disposed as a loop encircling around a sprocket 99 at an outer end of the beam 90 and a sprocket 100 on a shaft of a servo motor 102 mounted at the inner end of the beam 90. The belt 98 is connected so as to move the charger lower flitch support member 94 longitudinally along the slide track as controlled by the servo motor 102. The servo motor is preferably capable of being controlled by the control computer 74 to move the endless belt to position the lower charger flitch support member 94 precisely, to an accuracy of ±0.001 inch.

Each of the elongate charger lower support members 94 desirably has a portion 104 near its outer end that may be called a turntable. The turntable 104 may be a set of concentric circular ridges extending proud of the surrounding surface of the respective lower charger member with a height of, for example, 0.020 inch, that will provide a reasonably secure grip on a bottom face of a flitch, without noticeably marring the surface of the wood. With a charger lower flitch support member 94 in the retracted position, a flitch 24, etc. in the transfer ready location 78 at hook stop #6 is directly above the turntable of the feed fork.

An upper charger support structure 106 that is part of each charger set 82 or 84, etc. extends toward the scanner and carriage assembly 32 from a support frame structure at a rear side of the edger infeed assembly 22. An endless belt 108 extends horizontally along the upper charger support structure 106, looped around a sprocket 110 at an outer end of the upper support charger structure 106 and a drive sprocket 112 mounted on a clamp pad positioning servo motor 114 at an inner end of the upper support frame structure. A clamp pad actuator 116 that may be an air cylinder-and-piston assembly is mounted on a slide track 118 extending horizontally along the upper support structure 106. The clamp pad actuator 116 is connected with the endless belt 108 so that the clamp pad servo motor 114 controls its position along the slide track 118 under the control of the computer 74 with the same degree of precision by which the lower charger flitch carrier member 94 is controlled, so as to keep the actuator 116 located above the turntable 104. A clamp pad 120 is carried on a moveable member of the clamp pad actuator 116, and is thus kept directly above the center of the turntable 104. The clamp pad 120 is arranged to move vertically so as to press a flitch 24, 26, etc. down onto the turntable 104 of the lower flitch support member 94. It will be understood that either an air cylinder or another convenient type of motor such as an electric actuator or a hydraulic cylinder-and-piston assembly could be used as the clamp pad actuator 116.

The lower charger beam 90 of each charger set 82, 84, etc. can be moved through a small angle about its pivot 92, by a motor 122 such as an air cylinder and piston mounted on the frame of the scanner and carriage assembly and linked to an outer end of the beam 90. By lowering the outer end of the beam 90, the outer end of the charger lower flitch support member 94 can be lowered a small distance, for example about ½ inch, to be clear of the bottom face of a flitch 24, 26, etc. in the transfer ready position 78 at the outfeed end of the scanner and carriage assembly 32 until the turntable 104 and clamp pad 120 of the charger set 82, etc. is in a required position and is intended to engage the flitch at the middle 123 of its width. When the charger set 82, etc. is correctly located the motor 122 can raise the outer end of the lower flitch support member 94, bringing its turntable 104 into contact with the flitch that is ready to be transferred. At the same or shortly later time the clamp pad 120 can be lowered against the upper face of the flitch.

Figure 10:
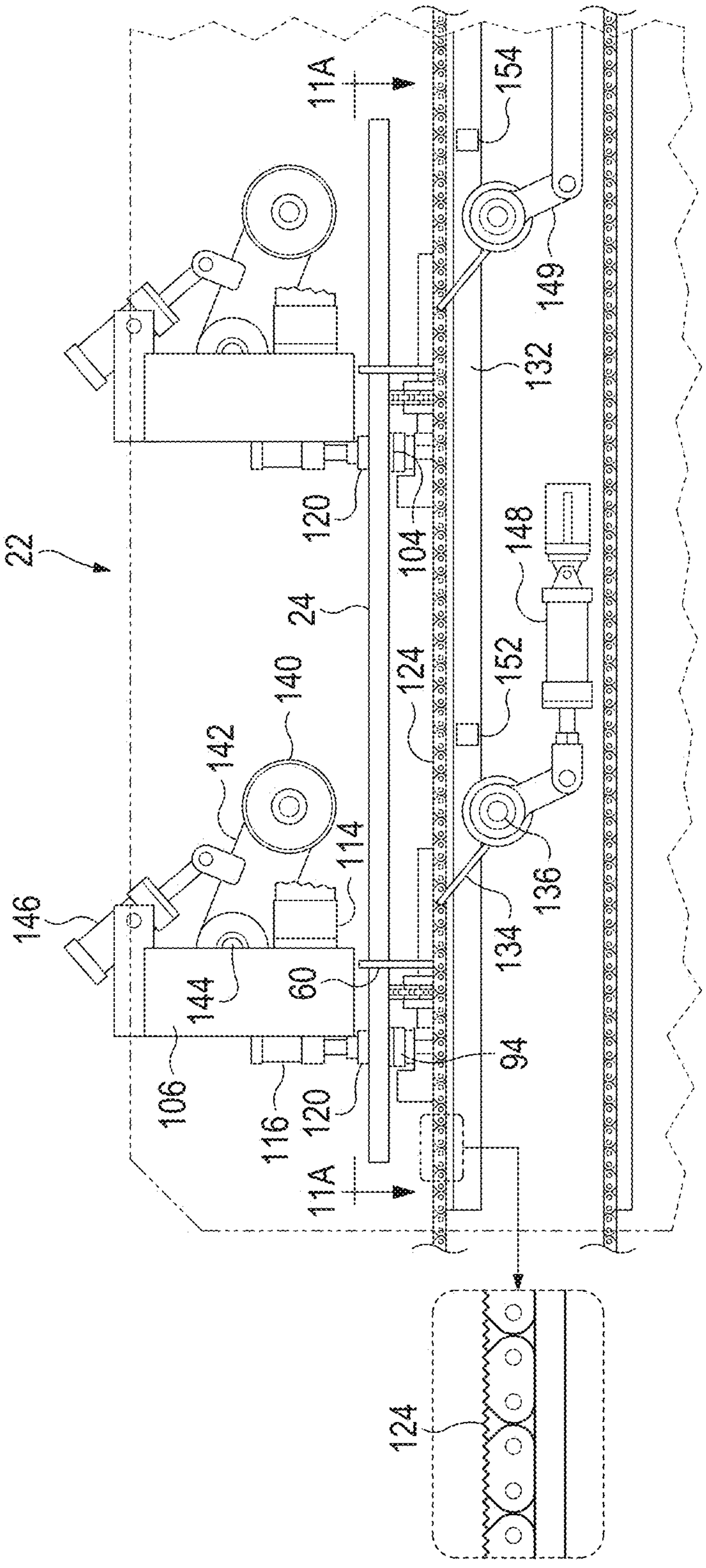
FIG. 10 is a rear elevational view, taken in the direction of line 10-10 in FIG. 6, showing a portion of the apparatus shown in FIG. 4, at an enlarged scale, with a flitch in the transfer ready position and with a rear main plate of the apparatus shown in phantom view to disclose portions of the apparatus that otherwise would be hidden.

The edger infeed mechanism 22 may include an endless edger infeed chain 124 arranged as a loop around suitable sprockets, a drive sprocket 126 and an idler sprocket 128, and driven continuously in a vertical plane perpendicular to the infeed chains of the scanner and carriage assembly 32 so as to carry a flitch 24, etc. longitudinally into the edger 20. An upper run 130 of the edger infeed chain 124 may extend along and ride upon a suitable horizontal support rail 132. The edger feed chain 124 may be a roller chain with the outer edges of the side plates of each link having a sawtooth shape, as shown in the inset in FIG. 10, intended to engage a bottom surface of a flitch 24, etc. firmly but without noticeable marring, and the edger infeed chain may be referred to herein as a sharpchain 124.

A respective tipple 134 is associated with each of the charger sets 82, 84, 86, and 88, and each tipple will be referred to separately by the member of the charger set with which it as associated. Each tipple is mounted on a respective tipple shaft 136 extending horizontally and perpendicular to the plane of the edger infeed chain 124 and thus parallel with the direction of movement of flitches along the scanner and carriage assembly 32. The tipples 134 may be generally planar, extending radially outwardly away from the respective tipple shafts 136. The tipples 134 have outer margins 138 that may have roughened or textured surfaces intended to engage a bottom face of a flitch frictionally.

A respective infeed press roller 140 may be mounted for rotation about the axis perpendicular in the place of the sharpchain 124 and may be carried on a support arm 142 attached to each of the upper charger support beams 106 on its upstream side, further from the edger 20 and opposite the location of the associated clamp pad actuator 116. The support arm 142 may be arranged to pivot up and down about a horizontal pivot axis 144 that may also be perpendicular to the plane of the edger infeed sharpchain 124. A suitable motor 146 such as an air cylinder-and-piston assembly is arranged to raise and lower the edger infeed press roller 140 to press a flitch 24, etc. down against a tipple 134 in the edger ready position and also while lowering the flitch onto the upper 130 of the sharpchain 124, and then to keep the flitch in contact with the sharpchain 124 as the flitch is delivered into the edger 20.

Figure 4:
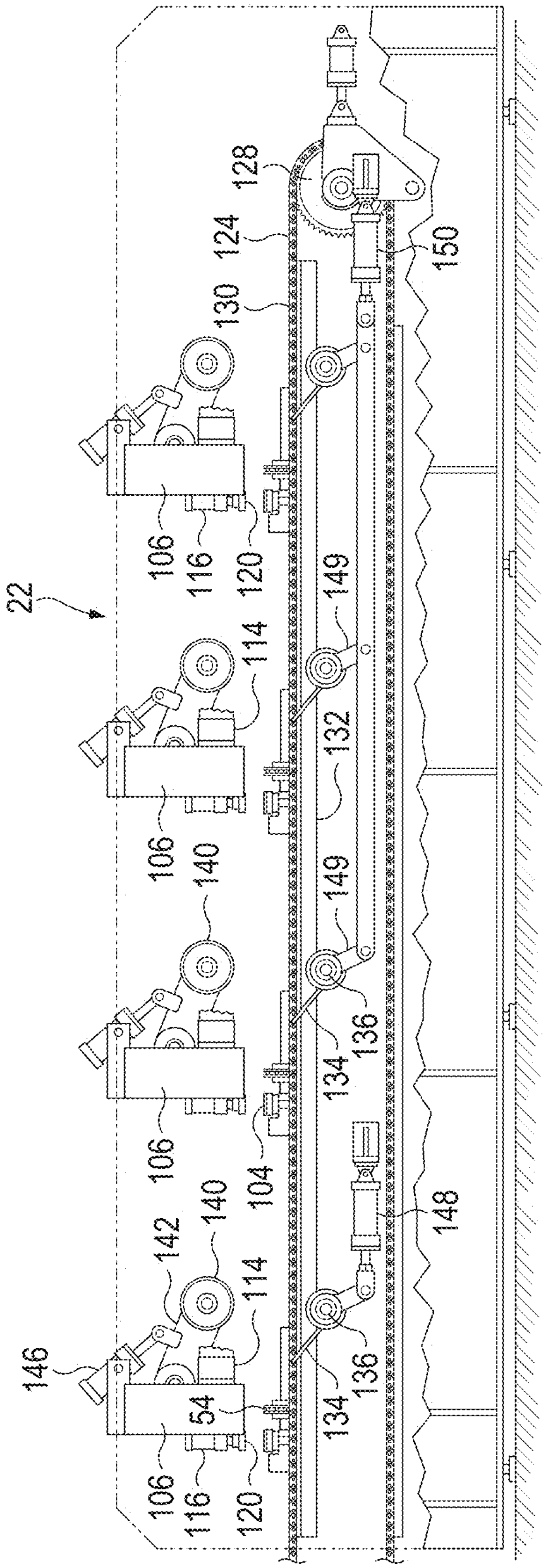
FIG. 4 is a partially cutaway rear elevational of the apparatus shown in FIG. 1, taken along line 4-4 in FIG. 3.
Figure 12:
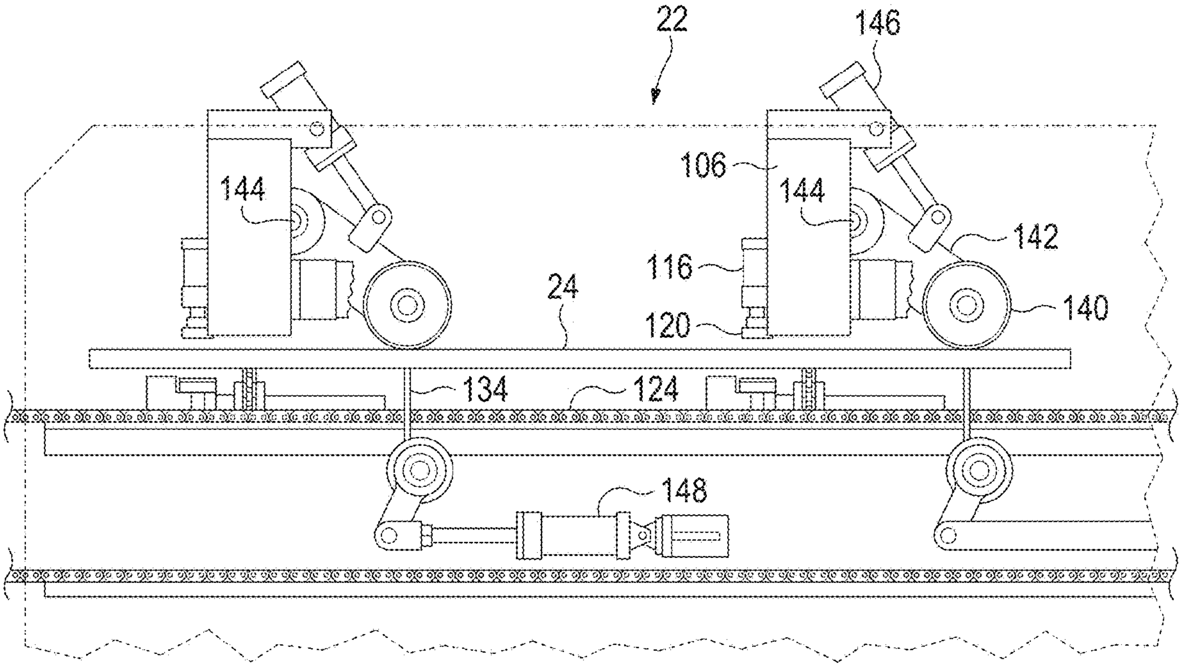
FIG. 12 is a view of the portion of the apparatus shown in FIG. 10, showing a flitch being supported by tipples and held in the edger ready position or station by infeed press rollers with the lower charger mechanisms and press pads disengaged from the flitch.

The tipple shafts 136 are located beneath the infeed press rollers 140, allowing each of the tipples 134 to be rotated, between a lowered position as seen in FIG. 4, alongside the upper run 130 of the edger infeed sharpchain 124, and a raised, generally upright, position as shown in FIG. 12, in which an outer margin 138 of each tipple is located above the sharpchain 124 and can bear upon a bottom face of a flitch supported on the charger lower flitch support member 94. The shaft of the #1 tipple can be rotated by an associated bell crank and motor 148, while the shafts of the #2, #3, and #4 tipples have respective bell cranks 149 all linked together and controlled by motor 150, so that the #2, #3, and #4 tipples can all be raised or lowered simultaneously.

Suitable sensors such as photocells 152, 154 may be located respectively a short distance upstream from each of the #1 tipple and the #2 tipple, in positions enabling the sensors to recognize that a tail end 162 of a flitch is passing the respective one of the tipples 134.

Figure 11A:
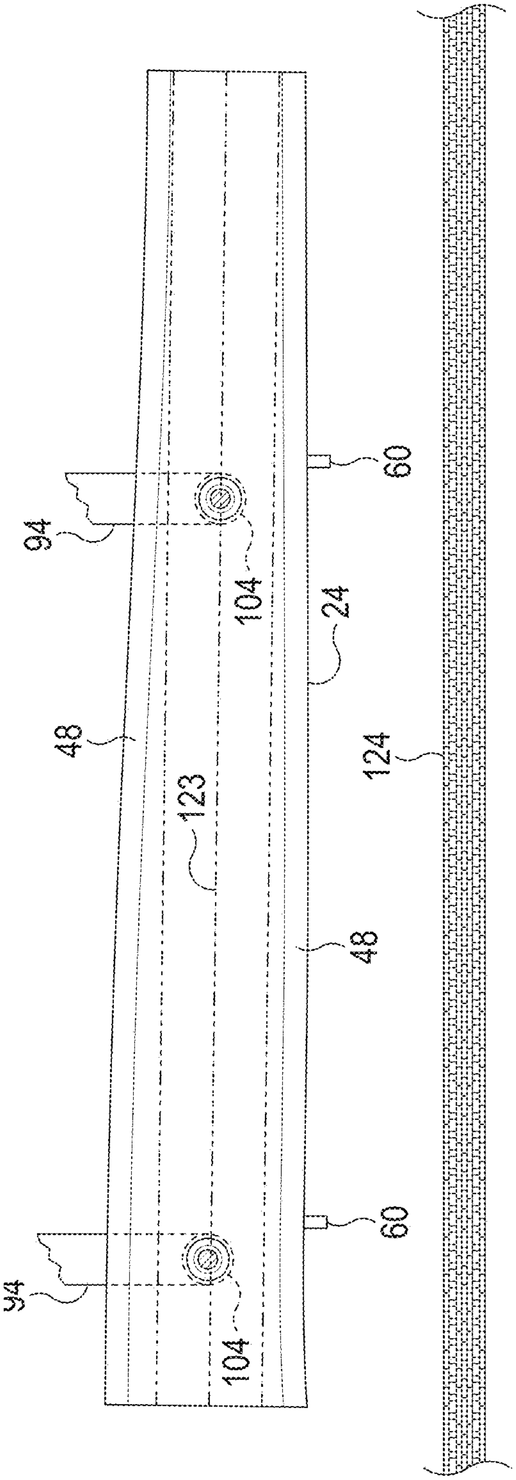
FIG. 11A is a somewhat schematic top plan view taken in the direction of the line 11A-11A in FIG. 10, showing a portion of the charger assembly at the outfeed end of the scanner and carriage assembly, showing the position of engagement of a flitch by the feed forks.
Figure 11B:
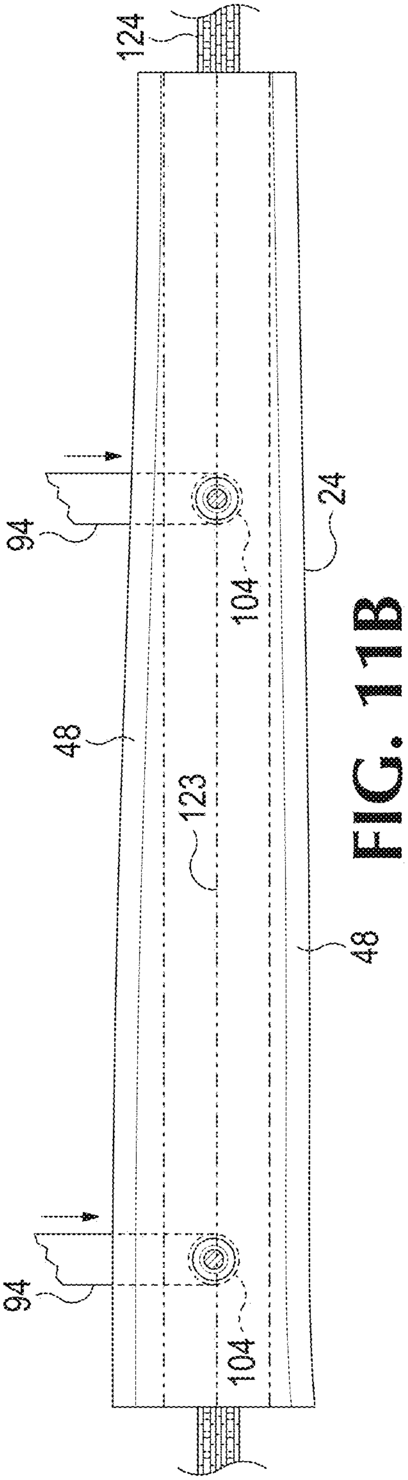
FIG. 11B is a view similar to that of FIG. 11A showing the flitch in a position of readiness to be lowered onto the edger infeed mechanism.

Under digital control from the control computer 74, each lower flitch carrier servo motor 102 and the associated clamp pad actuator positioning servo motor 114 are operated synchronously to move a respective end of a flitch 24, etc. from the transfer ready position 78 over a distance determined by the control computer 74 on the basis of the digital three-dimensional model of the particular flitch. A flitch thus can be moved from the transfer ready location 78 toward a calculated edger ready position 156 directly above the sharpchain 124 of the edger infeed mechanism 22. As shown in FIGS. 11A and 11B, the control computer 74 causes each charger set 82, 84, etc. to move a respective end of a flitch a distance calculated to place the flitch in a required location and orientation above the edger infeed sharpchain 124, ready to be carried to the saws 31 of the edger 20 and sawn into a board or boards that will maximize the value of the lumber cut from each flitch.

The sequence of steps for carrying flitches through the edger feed apparatus and the edger is shown in a flow chart embodied in FIG. 18. Communication connections between key positions of the systems are shown in FIG. 19, and an example of the timing sequence of actions in a cycle of handling a flitch is diagrammed in FIG. 20. The actions shown in FIG. 20 will be noted herein by step numbers in parentheses. A flitch may be placed flat on the scanner and carriage apparatus 32 with an end 158 of the flitch that is eventually to be the leading end of the flitch aligned with the lumber line 42 at the right end of the scanner and carriage assembly 32. The feed chains 54 are continuously in motion and carry the flitch 30 to hook stop #1, where the first set of hooks 60 engage the leading edge of the flitch and align the flitch 30 in the full taper orientation. At an appropriate time, ultimately as a result of a flitch being transferred away from hook stop #6, the set of hooks of hook stop #1 will be dropped allowing the flitch to move to hook stop #2, where flitch 28 is shown in FIG. 1. At each hook stop sensors will detect when the hooks 60 at the next subsequent hook stop are lowered so that a preceding flitch is starting to move away leaving space for the flitch being held at the lower-numbered hook stop, whose hooks 60 will then be lowered in response. As soon as a flitch has moved clear of a hook stop the hooks 60 are again raised to stop the next flitch. When the hooks 60 of hook stop #2 are dropped, the feed chains carry the flitch to hook stop #3 where it is engaged and stopped by the again-raised hooks 60 at hook stop #3. While moving between hook stop #2 and hook stop #3 the flitch 26 may have been scanned by a relatively simple scanner (not shown) to determine whether the wane is oriented up or down, and the determination will have been transmitted to the control computer 74. Between hook stop #3 and hook stop #4 there may be a flitch turner selectively operative to turn up the wane side of a flitch if necessary. If the wane face is down the flitch turner will engage the flitch and turn it over to bring the wane face to the top. If the wane is already facing upward the control computer 74 will cause the feed chains 54 to carry the flitch on to hook stop #4, carrying the flitch so its leading edge contacts the hooks 60 and the flitch is thereby placed into a full taper orientation.

Figure 5:
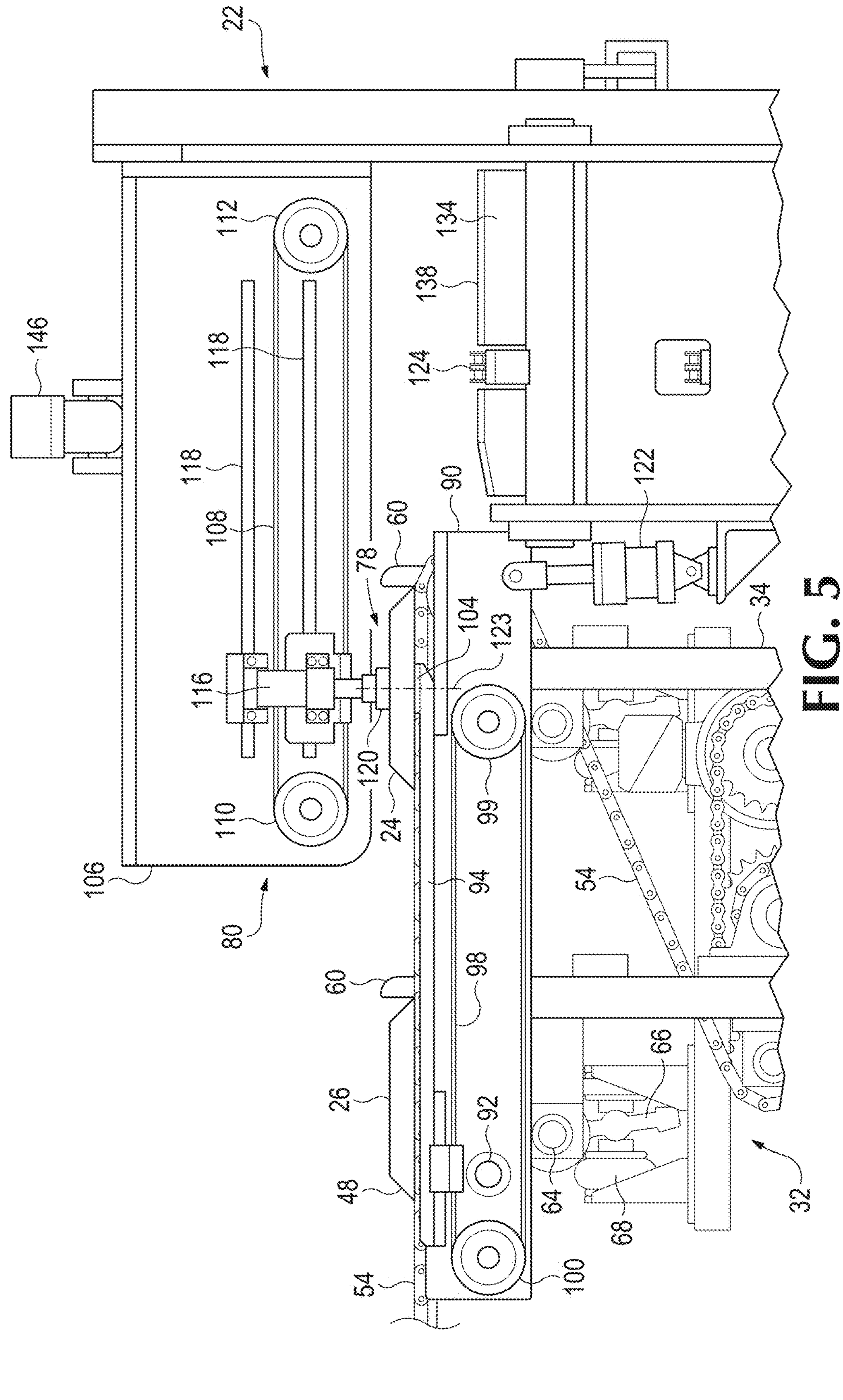
FIG. 5 is a right side elevational view of a portion of the apparatus similar to that shown in FIG. 3, at an enlarged scale and showing a flitch ready to be moved into position to be fed into the edger.
Figure 6:
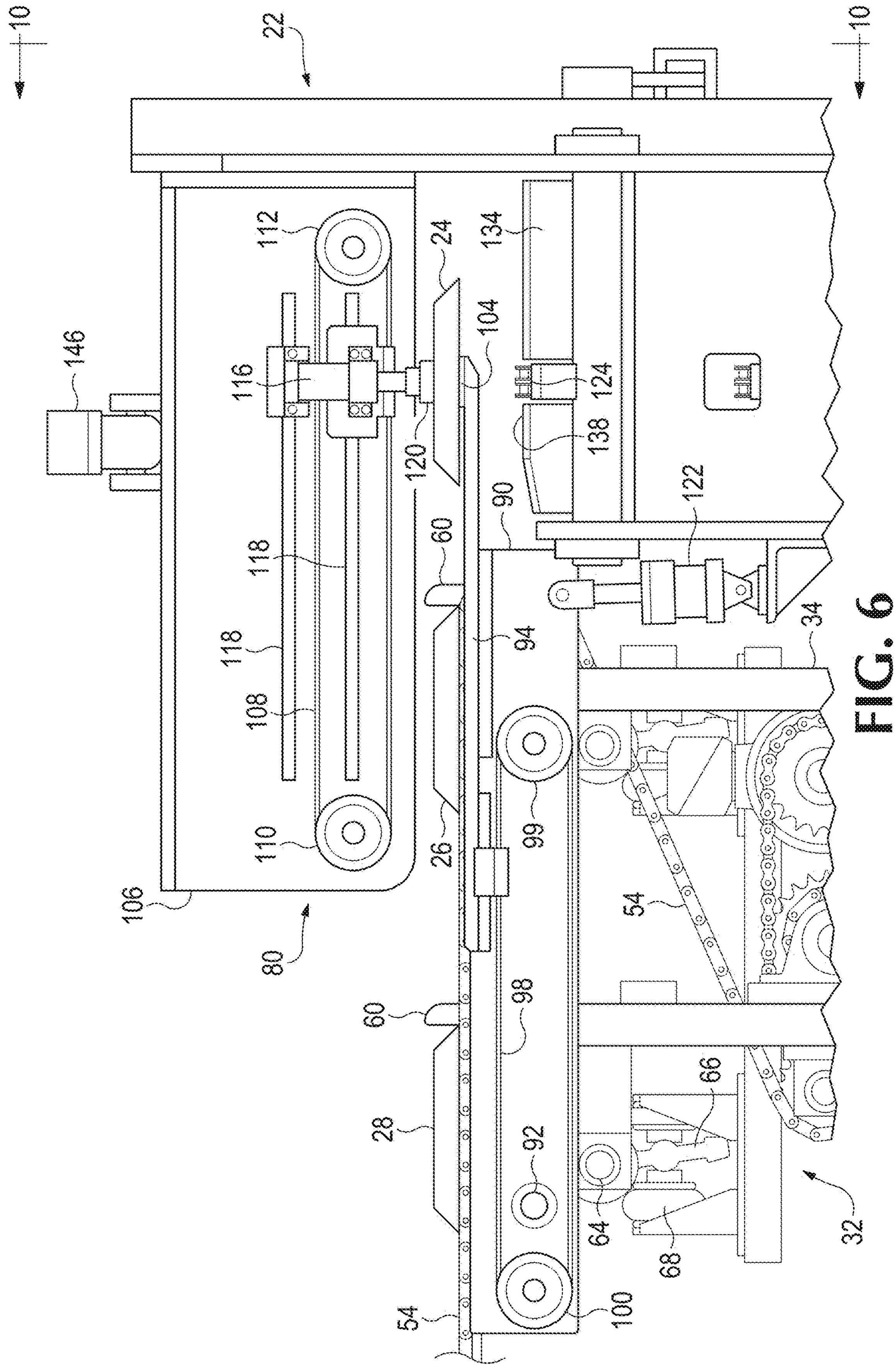
FIG. 6 is a view of a portion of the apparatus similar to that shown in FIG. 5, showing a flitch being held in an edger ready station above the edger infeed mechanism.
Figure 7:
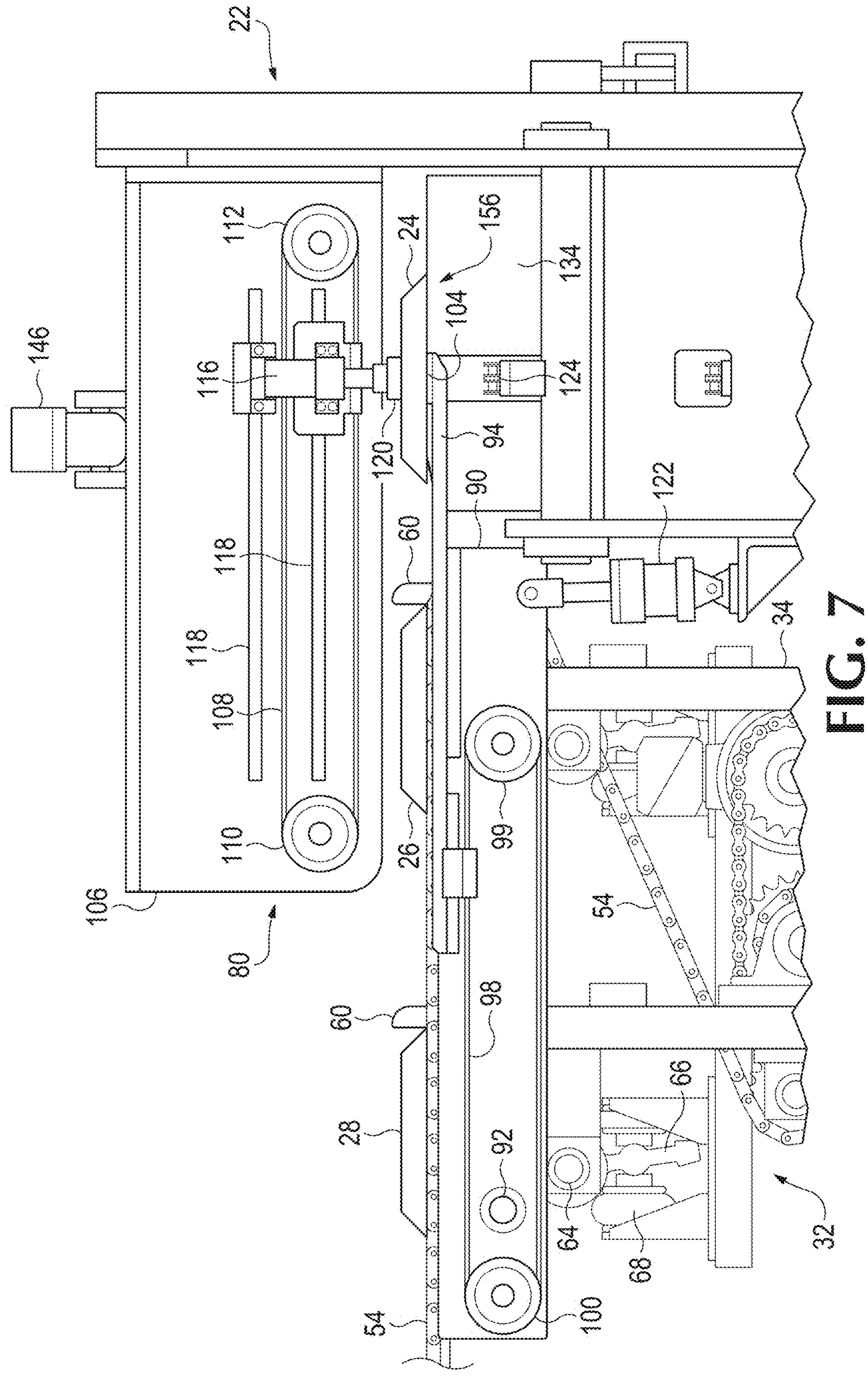
FIG. 7 is a view similar to FIG. 6, showing a tipple raised into position to support the flitch in the edger ready station.

When the hooks of hook stop #4 are lowered the feed chains 54 carry the flitch through the scanner support structure 70, and the upper and lower scanner arrays 72 measure the flitch and transmits scanner data to the control computer 74, enabling the control computer to generate the digital three-dimensional model of the flitch. When the flitch just scanned reaches hook stop #5 the flitch is retained until a preceding flitch at hook stop #6 has been engaged by the charger mechanism 80 and is being transferred toward the edger ready position 156. When the charger mechanism 80 has carried a proceeding flitch clearly away from the transfer ready position at hook stop #6 the hooks of hook stop #6 are raised to stop the flitch being moved from hook stop #5 in the transfer ready position in hook stop #6 at the outfeed end of the scanner and carriage assembly as shown in FIG. 5.

The feed chains 54 thus eventually carry each flitch 24, 26, etc. to the transfer ready position 78 at an outfeed end of the scanner and carriage assembly 32 at hook stop #6, where a charger assembly receives the flitch and moves it to the edger ready location 156 above an edger infeed mechanism 22 arranged to carry the flitch into the edger 20.

In the transfer ready position 78, the desired set of hooks 60 of hook stop #6 stop the flitch 24 and establish a full taper orientation, located where the flitch can be grasped to be moved to the desired orientation in the edger ready position and location 156 from which it is to be moved onto the edger infeed mechanism 22. With the flitch in the transfer ready location 78, at least a pair of the elongate charger lower flitch support members 94, are located beneath the flitch in a retracted position along the slide track on the beam 90.

When the flitch 24 has arrived at hook stop #6 it is ready for the charging sequence to be performed as directed by the control computer 74. This begins as shown in FIG. 3, with each charger set 82, 84, 86, etc. spanned by the length of the flitch 24 being moved to the position of the centerline 123 of the flitch, as determined from the three-dimensional digital model. With the lower flitch support member 94 lowered and the clamp pad 120 raised. Based on the digital three-dimensional model of the flitch 24 developed by the control computer 74, each lower flitch support member 94 is moved along the beam 90 by the servo motor 102 to place the turntable 104 beneath the longitudinal centerline 123 of the flitch 24, with the lower charger flitch support members 94 in their respective lowered positions. The lower flitch support members 94 can then be raised to bring the turntable 104 into contact with the bottom face of the flitch, as shown in FIG. 5 (step 1), and the clamp pads 120 can also be lowered onto the upper face of the flitch (step 2). Depending on the sawing solution the appropriate charger sets (depending on the length of the flitch), engage the flitch 24. The clamp pads of the #1 charger set 82 and of the charger set 88 nearest the opposite end of the flitch 24 are lowered to press on the top face of the flitch, but the clamp pads of a charger set between those charger sets are not lowered to press on the flitch. Once this has been accomplished the hooks 60 of hook set #6 are lowered (step 3).

When a previous flitch has been carried on the sharpchain 124 far enough into the edger 20 for press rollers 121 within the edger 20 to grip the previous flitch, the press rollers 140 of the charger sets #2, #3, and #4 are raised (step 4). When the tail end 162 is detected passing a sensor such as photocell 152 at the #1 charger set 82 the infeed press roller 140 at the #1 charger set 82 is raised, providing clearance above the sharpchain 124 to receive the flitch 24 being supported by the charger sets 82 and 88 at the transfer ready location. While the press rollers 140 are being raised the charger sets are briefly held (step 5) before moving the flitch 24 to the edger ready position 156.

When the space above the tipples 134 is cleared the two engaged charger sets may move by slightly different distances away from the transfer ready location 78 and toward the opposite side of the edger infeed mechanism 22, moving the flitch 24 to the edger ready position 156 above the sharpchain 124 of the edger infeed mechanism in which the desired saw cut lines are parallel with the sharpchain 124 and where the flitch is offset laterally as necessary to rest in an optimal transport position on the sharpchain (step 6).

Figure 14:
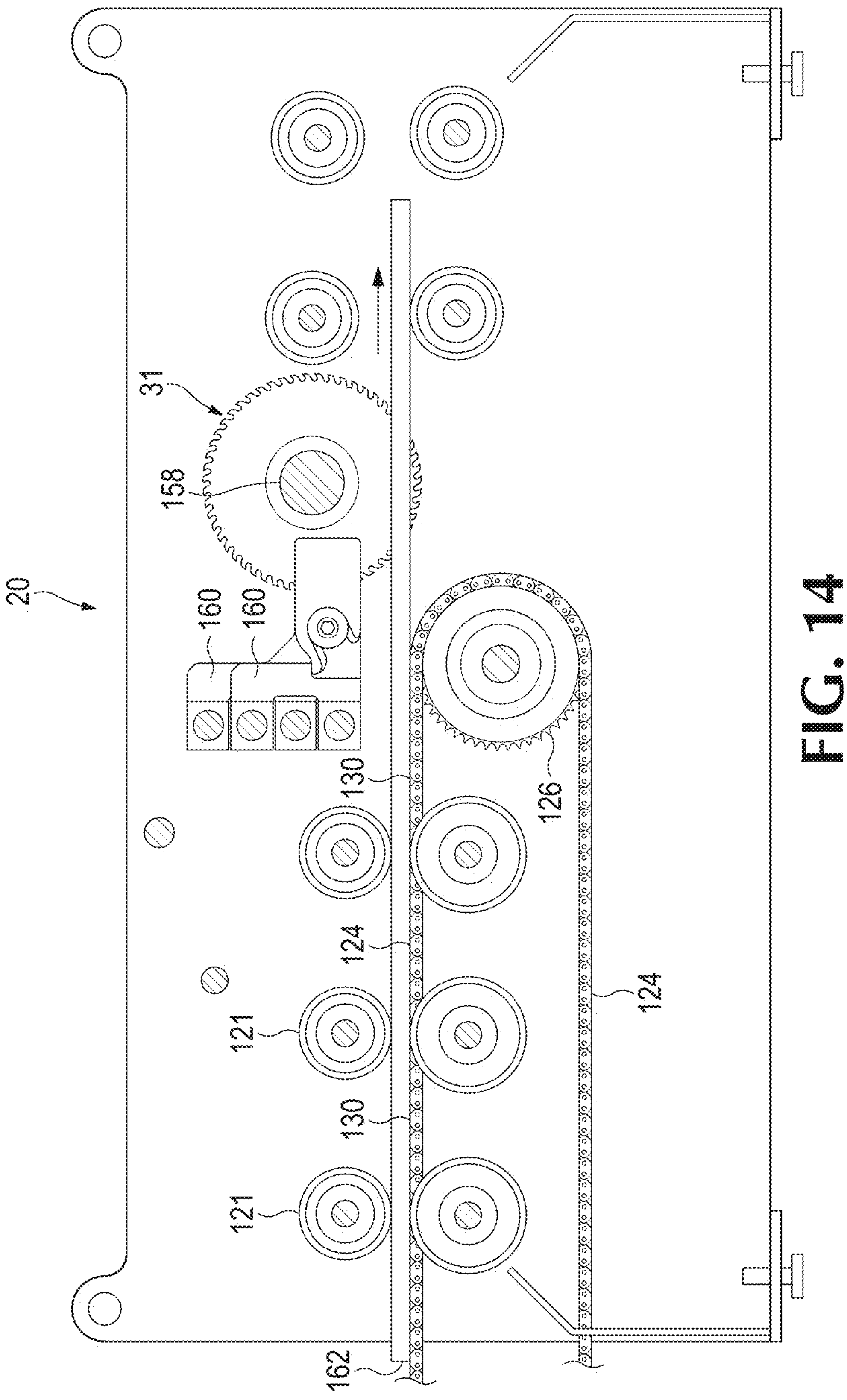
FIG. 14 is a simplified front elevational view of the edger shown in FIGS. 1 and 2.

As the flitch 24 moves clear of the transfer ready position 78 the hooks 60 of hook stop #6 are raised (step 7). When a flitch 24 has been carried by the lower flitch carrier members to the edger ready position in the calculated location and orientation above the sharpchain 124 of the edger infeed mechanism 22 it is held there until a preceding flitch has been moved far enough into the edger 20 so that none of the preceding flitch remains above any of a set of tipples 134, as in FIG. 14. The tipples 134 are then rotated to their raised positions (steps 9, 15) in which a portion of each tipple 134 extends upward on each side of the sharpchain 124, and the outer margin surfaces 138 of the tipples bear against the underside of the flitch 24 and support the flitch in the edger ready position 156 established by the charger assembly 80. The tipples may thus lift the flitch 24 slightly. The edger infeed press roller arms 142 are then pivoted downward bringing the infeed press rollers 140 into contact on the upper face of the flitch, urging the flitch against the outer margin surfaces 138 of the tipples 134 (step 10).

Once the flitch 24 is supported by the tipples 134, the lower charger beam actuator 122 is retracted to lower the lower flitch carrier members 94 a small distance from the lower face of the flitch, and the hold down pads 120 are raised from the upper face of the flitch (step 11). The flitch carrier motors 102 and hold down clamp pad carrier motors 114 are then operated to retract the lower flitch carrier members and move the clamp pad actuator 116 toward the transfer ready position 78 so as to be clear of the flitch 24 and ready to engage the flitch 26 when it is moved into the transfer ready position by the next cycle of the scanner and carriage assembly 32 (steps 12, 13).

Figure 8:
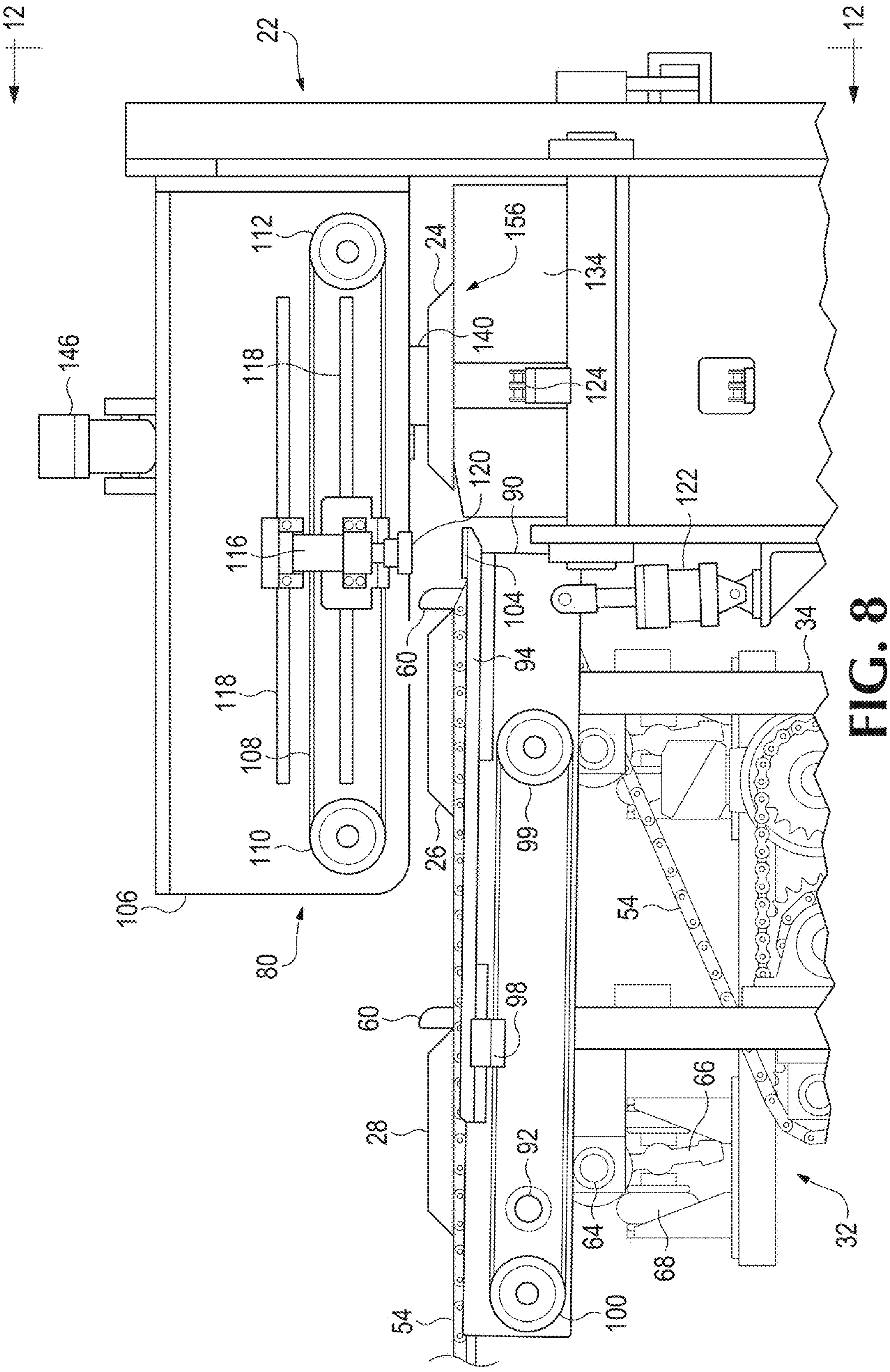
FIG. 8 is a view similar to FIG. 7, showing the tipple supporting the flitch and the feed fork and pressure pad moved toward a transfer ready position at the delivery end of the scanner and, carriage assembly
Figure 9:
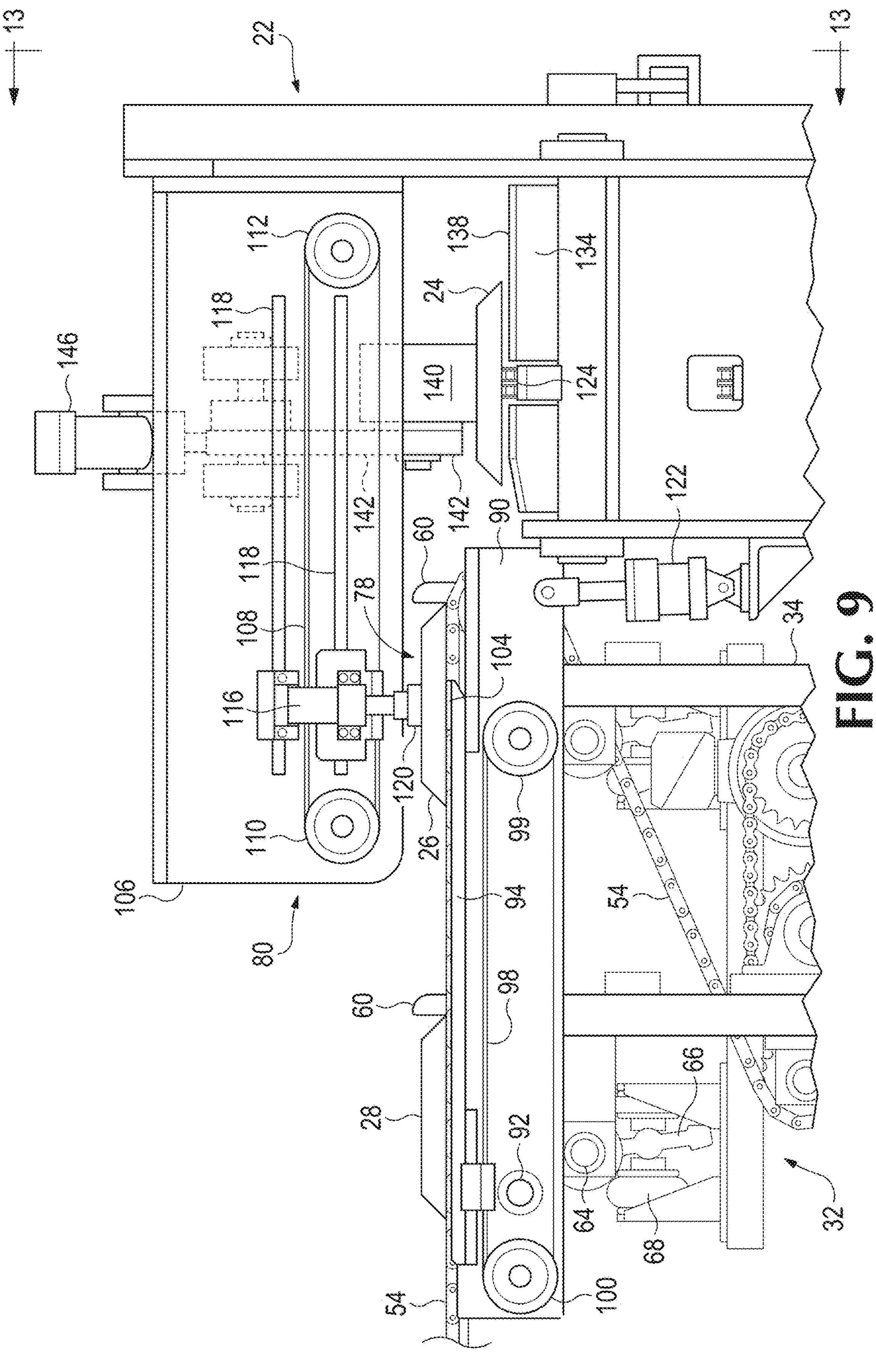
FIG. 9 is a view similar to FIG. 5, showing the flitch after being lowered onto the edger infeed mechanism.

The flitch 24 is then held between the tipples 134 and the edger infeed press rollers 140 as shown in FIG. 8 for at least a long enough time to provide an optimum end gap, enough separation between the tail end of the preceding flitch and the leading end 41 of the current flitch 24 for the preceding flitch to be sawn and moved clear of the saws 31 within the edger 20, before the current flitch engages the saws 31. Additionally, lowering the current flitch 24 must be delayed long enough to permit any relocation of the sawblades on the saw arbor that may be required in accordance with the sawing solution determined by the control computer 74.

Figure 15:
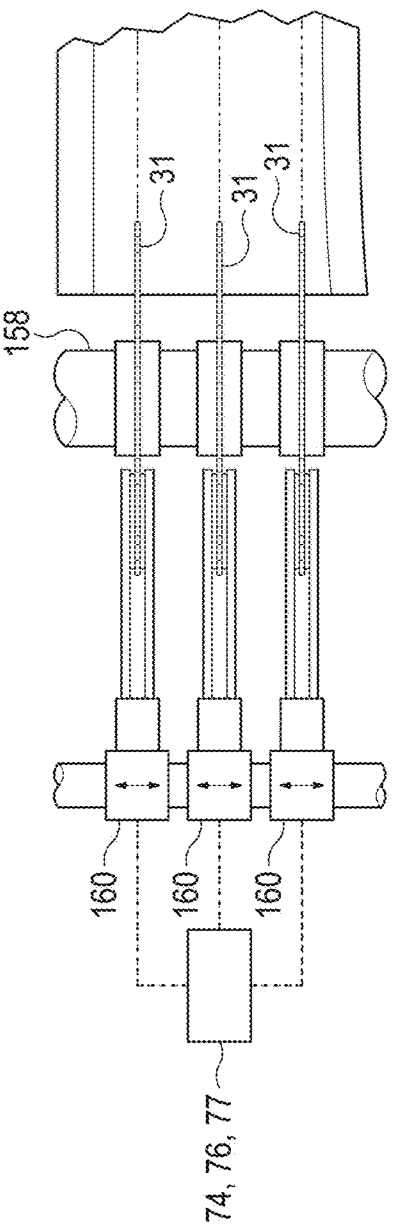
FIG. 15 is a somewhat schematic view showing saw blades of the edger shown in FIG. 14 and apparatus for moving the saw blades along an arbor of the edger.
Figure 16:
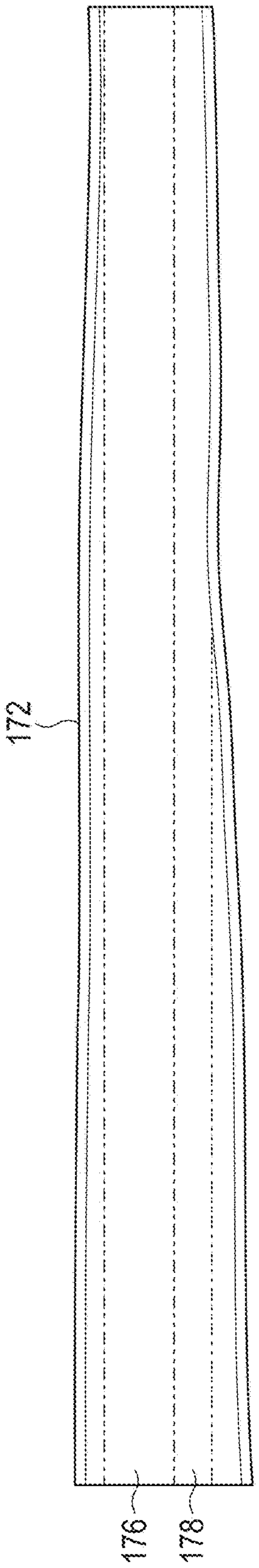
FIG. 16 is a top plan view of a flitch showing the positions of saw cuts on the flitch according to a sawing solution developed by the control computer.
Figure 17:
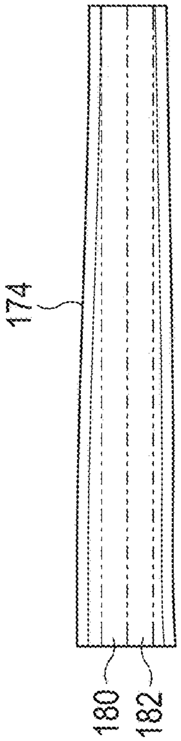
FIG. 17 is a top plan view of a different flitch from that shown in FIG. 16, and showing the planned cuts according to a sawing solution for that flitch.

Once the charger lower flitch support members 94 and clamp pad 120 and their actuators 116 have moved away from the flitch 24 the tipples 134 are not obstructed and are clear to be rotated downward. When the sawing solution for the flitch 24 being moved laterally into the upper edger ready position 156 calls for it to be sawn by the edger 20 into the same number and sizes of boards as the immediately preceding flitch, very little time is required for adjustment of the positions of the edger saw blades by the servo motors 160 as directed by the control computer 74 as shown in FIG. 15. There is then only a minimum delay (step 18) required between the tail end 162 of a preceding flitch and the leading end 41 of the flitch 24 about to be lowered onto the edger infeed sharpchain 124. When the flitch 24 is to be sawn into boards of different widths and locations on the flitch 24 than how the preceding flitch has been sawn, the positions of the edger saw blades 31 must be adjusted along the edger saw arbor 158 using servo motors 164 controlled by the control computer, as shown in FIG. 15. This requires additional time (and resulting distance along the edger feed chain 124) between the tail end 162 of the preceding flitch and the leading end 41 of the flitch 24. That distance may be determined by the photocell 152 sensing passage by the tail end 162 of the preceding flitch past the #1 tipple 134 (step 14), and by data from encoders on the feed roller 121 of the edger 20. The edger saws 31 can be quickly relocated on the arbor 158 as controlled by the computer 74, using data from the optimizer 76 and processed through programmable logic controller 77. The edger 20 can thus be quickly adjusted to saw the flitches 172 and 174 into different widths of boards 176, 178, 180 and 182, shown in FIGS. 16 and 17.

Figure 13:
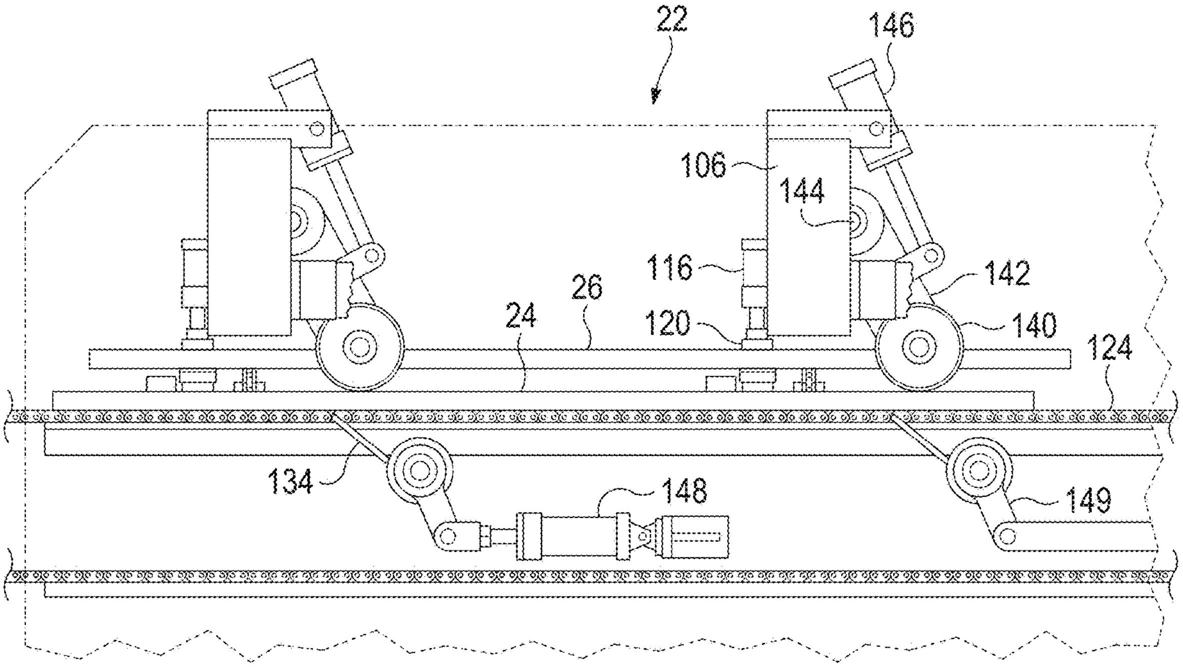
FIG. 13 is a view similar to FIG. 12, but showing the flitch resting on a sharpchain portion of the edger infeed mechanism with the tipples lowered and the infeed press rollers pressing the flitch onto the infeed mechanism sharpchain, while the lower charger mechanisms and press pads have engaged a following flitch at the transfer ready position.

As may be seen in FIG. 12 and FIG. 13, rotating the tipples 134 downward accelerates the flitch in the direction of movement of the upper surfaces of the sharpchain 124 toward the entry into the space between the press rollers 121 of the edger itself, as well as lowering the flitch into contact with the top of the sharpchain 124.

As the tipples 134 are rotated downward the infeed press rollers 140 are also moved downward, remaining in contact with the top face of the flitch 124 and pressing the flitch first against the outer margins 138 of the tipples and then against the upper edges of the sharpchain. The sharpchain 124 then carries the flitch toward the edger 20, feeding the leading end of the flitch between the edger press rolls 121 which then engage the flitch and move it through the saws to cut the flitch into boards according to the optimal sawing solution that was generated by the control computer 74 prior to operation of the charger mechanism.

After the calculated amount of movement of the tail end 162 of the previous flitch beyond the tipples, allowing for repositioning of the edger saws as mentioned above, the tipples 134 are lowered and the flitch 24 descends down upon the edger infeed sharpchain 124 and is pressed downward against the edger infeed sharpchain 124 by the infeed press rollers 140. The edger infeed sharpchain 124 then carries the flitch 24 toward the edger 20. Referring now to FIGS. 14-17 the feed rollers 121 of the edger 20 then carry the flitch 24 into engagement by the saws 31, which cut the flitch 24 into boards and scrap edge material according to the sawing solution determined by the control computer 74.

By the time the flitch 24 has been moved far enough into the edger 20 and is being moved through the saws 31 by the feed rolls 121 of the edger 20 far enough so that the tail end of the flitch 24 has moved beyond the #1 tipple, the tipple 134 closest to the edger 20, the following flitch 26 should have been carried by the lower flitch carrier members 94 and clamp pads 120 into the edger ready position 156, so that the cycle can be repeated as subsequent flitches 28, 30 etc. are moved laterally through the series of hook stops, and are scanned and converted into three-dimensional models and saved in the memory of the control computer 74, together with the data necessary to each flitch to the edger ready position and ultimately through the edger 20.

Once the preceding flitch has cleared the tipples and the leading end 41 of the flitch 24 is supported by the tipples 134, when the tipples are lowered the flitch 24 supported by the tipples is already positioned to be fed to the edger saw blades 31 in the most advantageous position and orientation. The flitch has only to drop a small distance, such as about 4 inches, from the edger ready position 156 once the tail end 162 of the preceding flitch is clear from beneath the leading end 41 of the flitch 24 supported by the tipples. Lowering the tipples 134, with the edger infeed presser rollers 140 pushing down on the top of the flitch, accelerates the flitch toward the edger saw blades 31, bringing it to a speed approaching that of the edger infeed sharpchain 124. The tipples 134 and the edger infeed presser rollers 140 continue to positively grasp and hold the flitch 24 until the flitch-contacting surfaces 138 of the tipples 134 have been lowered beneath the level of the upper faces of the edger infeed sharpchain 124. The edger infeed sharpchain 124 then engages and moves the flitch toward the edger press rollers 121. This transfer of the flitch 24 from the infeed scanner and carriage assembly 32 to the edger infeed sharpchain 124 and the change of direction from lateral movement to longitudinal movement of the flitch can all occur within a very brief time, as shown in FIG. 20, since the flitches moving laterally are at a higher location than the flitches moving longitudinally and have a shorter travel distance, and thus, the flitches moving laterally can be moved precisely, controlled by the charger sets to a properly oriented edger ready position 156 directly above the edger feed mechanism 22 that is moving longitudinally toward the edger saw blades, and the flitch 24 then can be lowered onto the edger infeed sharpchain.

Figure 20:
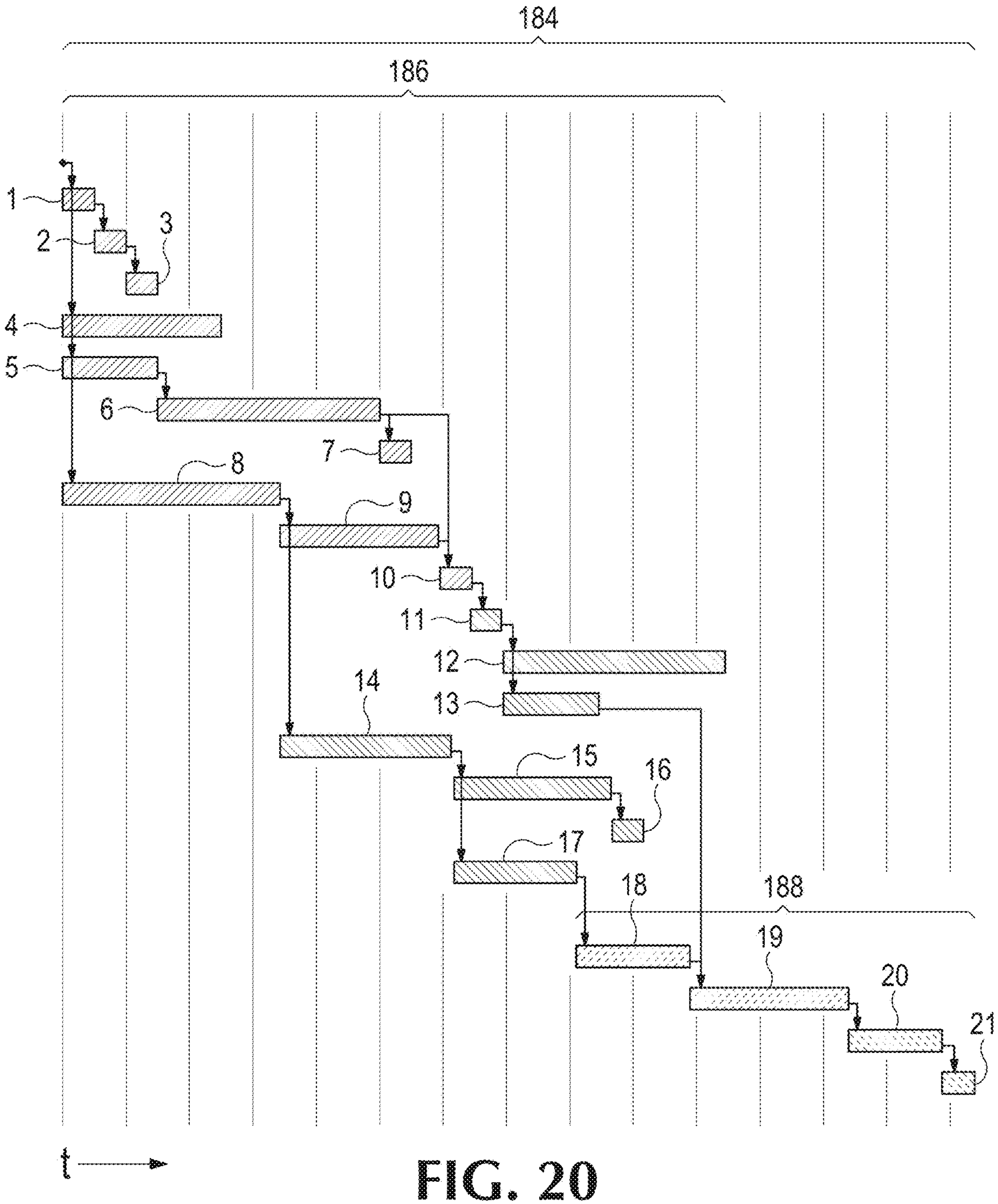
FIG. 20 is a timing diagram showing movements of components involved in transferring a scanned flitch from the outfeed end of the scanner and carriage assembly onto the sharpchain of the edger infeed mechanism, and then carrying the flitch into the edger.

Each time division on the time axis in FIG. 20 represents 100 ms. As may be seen in FIG. 20, an entire cycle 184 of moving a scanned flitch 24 from the transfer ready position 78, through the edger ready position 156, and into the press rollers 121 of the edger 20, occurs in a very short time. The numbered steps shown in FIG. 20 are listed in the following table:

TABLE 1

| | |
|---|---|
| 1. | Lower flitch carrier 94 raises in position on center of flitch face |
| 2. | Clamp pad 120 lowers in position on center of flitch face |
| 3. | #6 hook stop lowers |
| 4. | Edger infeed pressrollers 140 rise |
| 5. | Delay charger set advance as pressrollers 140 rise |
| 6. | Charger set advances flitch to sawing solution relative to center line |
| 7. | #6 Hook stop rises |
| 8. | Trailing end of preceding flitch clears tipple #2 |
| 9. | Tipples 2, 3, 4 rise |
| 10. | Pressrollers 2, 3, 4 lower, clamping flitch 24 to tipples |
| 11. | Clamp pad 120 raises & flitch carrier 94 lowers |
| 12. | Charger sets return to charger ready position (center of flitch face) |
| 13. | Charger set clear of flitch 24 |
| 14. | Trailing end 162 of preceding flitch clear tipple #1 |
| 15. | Tipple 1 raises |
| 16. | Pressroll 1 lowers, clamping infeed flitch 24 to tipples |
| 17. | Trailing end 162 of preceding flitch clears lumberline |
| 18. | Minimum required end gap relative to lumberline |
| 19. | Pressrollers 140 & tipples lower flitch 24 onto sharpchain 124 to feed edger 20 |
| 20. | Flitch 24 past number 2 edger pressroll 121 |
| 21. | Edger #2 pressroll down on flitch 24 |

During the entire cycle 184 a flitch transfer charging cycle 186, the complete set of actions for transfer of a flitch in a lateral direction from the scanner and carriage assembly 32 to the charger ready position 156, may be completed in less than one second. After necessary delay while a preceding flitch clears the edger infeed mechanism 22 and enough space is left behind the tail end 162 of the preceding flitch for the preceding flitch to be clear of the saws 31 of the edger 20 and the saw blade positions are adjusted, before the next flitch engages the saw blades 31. In a complete sharpchain loading cycle 188 each flitch can be lowered from the edger ready position 156 onto the edger feed sharpchain 124 and delivered into the edger 20 far enough to be engaged by the second feed press rollers 121 in slightly more than 0.6 second.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An edger feeder system for feeding a flitch having a thickness into an edger, comprising:

(a) a flitch feedline arranged to move a plurality of elongate flitches serially and in a transverse, lateral, direction relative to a length of each of the flitches, toward a transfer ready position at a delivery end of the flitch feedline;

(b) a scanner system located adjacent the flitch feedline and arranged to measure each of the plurality of flitches at a plurality of locations on each of the plurality of flitches;

(c) a control computer arranged to receive data from the scanner system and to provide control signals to the flitch feedline;

(d) an edger infeed mechanism arranged to engage and carry a respective one of the plurality of flitches into the edger, in a longitudinal direction with respect to the respective one of the plurality of flitches;

(e) a charger assembly arranged to transfer each of the plurality of flitches in turn from the transfer ready position on the flitch feedline to the edger infeed mechanism, the charger assembly including;

(i) a lower charger mechanism located adjacent the delivery end of the flitch feedline, arranged to carry each of the flitches in turn in a lateral direction as directed by the control computer, from the transfer ready position to an edger ready position spaced upwardly apart from the edger infeed mechanism; and (ii) a flitch-lowering mechanism arranged to support a respective one of the plurality of flitches in the edger ready position for a length of time established by the control computer and thereafter to lower the respective one of the plurality of flitches from the edger ready position onto the edger infeed mechanism, wherein the lower charger mechanism and the flitch-lowering mechanism are distinct and separate from each other, wherein, when the flitch is in the transfer ready position or the edger ready position, the flitch is in a first horizontal plane, and wherein the edger infeed mechanism is arranged such that, when the flitch is on the edger infeed mechanism, the flitch is in a second horizontal plane that is below the first horizontal plane by more than the thickness of the flitch.

2. The system of claim 1 wherein the scanner system is located in position to measure each one of the plurality of flitches prior to the respective arrival of each one of the plurality of flitches at the delivery end of the flitch feedline.

3. The system of claim 1, including a pressure pad located above the lower charger mechanism and arranged to move in coordination with a flitch supporting member of the lower charger mechanism and to urge a respective one of the plurality of flitches into contact with a flitch-engaging portion of the lower charger mechanism while the lower charger mechanism carries the respective one of the plurality of flitches from the transfer ready position to the edger ready position.

4. The system of claim 1 wherein the charger assembly includes a pressure pad arranged to press the flitch against a flitch supporting member of the lower charger mechanism.

5. The system of claim 3 wherein the lower charger mechanism and the pressure pad are movable as controlled by the control computer to move the flitch to the edger ready position located upwardly apart from the edger infeed mechanism and wherein a flitch in the edger ready position is aligned with the edger and located with respect to the edger in a position calculated by the control computer to bring the flitch into engagement by a plurality of saws included in the edger so as to saw the flitch in accordance with the sawing plan determined by the control computer.

6. The system of claim 1 wherein the flitch-lowering mechanism includes a plurality of movable tipples arranged to be raised into contact with a flitch in the edger ready position and to support the flitch in the edger ready position in the absence of the lower charger mechanism.

7. The system of claim 6 including a press roller mounted on a position of the charger assembly and arranged to be moved downward into contact with a flitch supported by at least one movable tipple of the plurality of movable tipples, the press roll arranged to be moved further downward and to be kept in contact with the flitch during operation of the flitch-lowering mechanism as the flitch is lowered onto the edger infeed mechanism by the plurality of movable tipples.

8. The system of claim 7 including a plurality of press rollers arranged to be movable into contact against the flitch and to press the flitch against the plurality of movable tipples when the flitch is supported by the plurality of movable tipples.

9. The system of claim 6 wherein the plurality of movable tipples is arranged to be rotated about a horizontal axis of rotation extending transversely with respect to the direction of movement of the edger infeed mechanism.

10. The system of claim 9 wherein the plurality of movable tipples is arranged to accelerate the flitch in a direction of movement of the edger infeed mechanism, toward the edger, as the plurality of movable tipples rotates to lower the flitch from the edger ready position onto the edger infeed mechanism.

11. The system of claim 1 wherein the flitch feedline includes a supporting frame structure and wherein the lower charger mechanism includes a beam attached to the supporting frame structure, and wherein a flitch carrying member is mounted on and movable along a track mounted on the beam including a servo motor mounted on the beam and connected with the flitch carrying member with the servo motor being controlled by the control computer and arranged to move the flitch carrying member along the track accordingly.

12. The system of claim 11 wherein the beam is attached to the supporting frame structure through a pivot support and is movable about a horizontal pivot axis established by the pivot support and permitting the flitch carrying member to move downwardly far enough to disengage the flitch carrying member from a flitch that is supported by a plurality of movable tipples.

13. The system of claim 1 including a sensor situated in a predetermined location with respect to the edger infeed mechanism and arranged to provide a signal to the control computer when the sensor detects that a flitch engaged by and being carried into the edger by the edger infeed mechanism passes the predetermined location with respect to the edger infeed mechanism, and in which the control computer is arranged to calculate when the flitch being carried by the edger infeed mechanism has moved clear from beneath the edger ready station and to calculate when to cause the flitch-lowering mechanism to lower a flitch from the edger ready station onto the edger infeed mechanism.

14. The system of claim 13 where the control computer is programmed to provide enough time for edger saw relocation as required by a sawing solution for a subsequent flitch after the sensor detects that a flitch passes the predetermined location before lowering the flitch.

15. The system of claim 1 wherein the lower charger mechanism includes a plurality of lower flitch carrier members separately controlled by the control computer to engage a flitch at apart spaced locations and move different distance and thereby to adjust the orientation of the flitch.

16. A method of feeding a flitch having a thickness into an edger, comprising:

(a) placing a flitch having a length and a width onto on a flitch feedline;

(b) moving the flitch laterally toward an edger infeed mechanism;

(c) scanning the flitch while the flitch remains on the flitch feedline, and thereby obtaining data concerning the shape and size of the flitch;

(d) producing a three-dimensional digital model of the flitch in a computer on the basis of the data obtained by scanning the flitch;

(e) moving, via a lower charger mechanism, the flitch laterally from the flitch feedline to an edger ready position at a distance above the edger infeed mechanism, the distance being greater than the thickness of the flitch;

(f) retaining, via a flitch-lowering mechanism that is distinct and separate from the lower charger mechanism, the flitch in the edger ready position for a time;

(g) lowering, via the flitch-lowering mechanism, the flitch onto the edger infeed mechanism at the end of the time; and (h) carrying the flitch on the edger infeed mechanism in a direction parallel with the length of the flitch, and thereby feeding a leading end of the flitch into the edger and into engagement by the edger.

17. The method of claim 16, further including:

determining that a tail end of a preceding flitch has moved clear from beneath the edger ready position before lowering the flitch from the edger ready position onto the edger infeed mechanism.

18. The method of claim 17, including providing an amount of time after movement of the tail end of the preceding flitch clear from beneath the edger ready position before lowering the flitch from the edger ready position onto the edger infeed mechanism.

19. The method of claim 18, wherein the amount of time includes sufficient time for a saw blade of the edger to be repositioned as required to saw the flitch, after a preceding flitch has been sawn and has cleared the saw blade of the edger, and before the flitch engages the saw blade of the edger.

20. The method of claim 16 including the steps of determining from the three-dimensional digital model of the flitch a preferred arrangement of saw cuts to be made in the flitch, and adjusting the position of the flitch accordingly before lowering the flitch onto the edger infeed mechanism.

21. The system of claim 7 including a support arm and a motor, the press roller being carried on the support arm, wherein the motor is arranged to move the press roller downward in contact with the flitch.

22. The system of claim 7 wherein the support arm pivots about a horizontal axis that is perpendicular to the longitudinal direction.

23. The system of claim 21 wherein the motor is an air cylinder and piston assembly.

* * * * *